(12) United States Patent
Guo et al.

(10) Patent No.: US 12,471,150 B2
(45) Date of Patent: Nov. 11, 2025

(54) TECHNIQUES FOR TRANSMISSION OF MESSAGE A (MSGA) IN AN IDLE PERIOD WITHIN A WIRELESS COMMUNICATION SYSTEM

(71) Applicant: QUALCOMM Incorporated, San Diego, CA (US)

(72) Inventors: Shaozhen Guo, Beijing (CN); Xiaoxia Zhang, San Diego, CA (US); Changlong Xu, Beijing (CN); Jing Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 378 days.

(21) Appl. No.: 18/011,097

(22) PCT Filed: Aug. 7, 2020

(86) PCT No.: PCT/CN2020/107665
§ 371 (c)(1),
(2) Date: Dec. 16, 2022

(87) PCT Pub. No.: WO2022/027546
PCT Pub. Date: Feb. 10, 2022

(65) Prior Publication Data
US 2023/0413342 A1    Dec. 21, 2023

(51) Int. Cl.
H04W 74/0833 (2024.01)
H04W 72/1268 (2023.01)
H04W 76/20 (2018.01)

(52) U.S. Cl.
CPC ..... *H04W 74/085* (2013.01); *H04W 72/1268* (2013.01); *H04W 76/20* (2018.02)

(58) Field of Classification Search
None
See application file for complete search history.

(56) References Cited

U.S. PATENT DOCUMENTS

2011/0034177 A1   2/2011  Oh et al.
2019/0387546 A1  12/2019  Li et al.
(Continued)

FOREIGN PATENT DOCUMENTS

WO    2020060371 A1   3/2020
WO    2020156071 A1   8/2020

OTHER PUBLICATIONS

Huawei, et al., "Coexistence and Channel Access for NR Unlicensed Band Operations", 3GPP TSG RAN WG1 Meeting #99, R1-1911866, 3rd Generation Partnership Project, Mobile Competence Centre, 650, Route Des Lucioles, F-06921 Sophia-Antipolis Cedex France, vol. RAN WG1, No. Reno, USA, Nov. 18, 2019-Nov. 22, 2019, Nov. 9, 2019, 18 Pages, XP051823048, FBE-based channel access, p. 14, paragraph 2.6-p. 15.
Supplementary European Search Report—EP20948427—Search Authority—The Hague—Mar. 13, 2024.
(Continued)

*Primary Examiner* — Benjamin Lamont
(74) *Attorney, Agent, or Firm* — Arent Fox, LLP

(57) ABSTRACT

This disclosure provides systems, methods and apparatus, including computer programs encoded on computer storage media, related to transmissions during an idle period of a fixed frame period (FFP). For example, a UE can receive, via system information or radio resource control (RRC) signaling, a FFP defining an idle period. The UE can further determine that a physical random access channel (PRACH) occasion (RO) resource or a physical uplink shared channel (PUSCH) occasion (PO) resource overlaps with the idle period of the FFP. The UE can additionally map the RO resource to the PO resource based on determining that the RO resource or the PO resource overlaps with the idle period of the FFP, and perform a random access channel (RACH) procedure according at least to the mapping of the RO to the PO.

30 Claims, 18 Drawing Sheets

(56) References Cited

U.S. PATENT DOCUMENTS

| | | | |
|---|---|---|---|
| 2021/0022143 A1* | 1/2021 | Xiong | H04L 5/10 |
| 2021/0051672 A1* | 2/2021 | Rastegardoost | H04W 74/006 |
| 2021/0058971 A1* | 2/2021 | MolavianJazi | H04B 17/318 |
| 2021/0084683 A1* | 3/2021 | Li | H04W 74/0808 |
| 2021/0307070 A1* | 9/2021 | Kim | H04L 25/0226 |
| 2021/0345424 A1* | 11/2021 | Cirik | H04W 72/23 |
| 2021/0360421 A1* | 11/2021 | Wang | H04W 74/006 |
| 2021/0368351 A1* | 11/2021 | Cui | H04W 74/002 |
| 2022/0078841 A1* | 3/2022 | Tiirola | H04W 72/02 |
| 2022/0174753 A1* | 6/2022 | Shin | H04W 72/1263 |
| 2022/0232642 A1* | 7/2022 | Ko | H04L 27/26 |
| 2022/0394757 A1* | 12/2022 | Wang | H04W 74/0808 |
| 2023/0189338 A1* | 6/2023 | Singh | H04W 74/0816 370/329 |

OTHER PUBLICATIONS

VIVO: "Remaining Issues on 2-Step RACH Procedure", 3GPP TSG RAN WG1 #100, R1-2000305, 3rd Generation Partnership Project, Mobile Competence Centre, 650, Route Des Lucioles, F-06921 Sophia-Antipolis Cedex, France, vol. RAN WG1, No. e-Meeting, Feb. 24, 2020-Mar. 6, 2020, 4 p. Feb. 14, 2020, XP051852794, PUSCH occasion validation rule, p. 3, paragraph 2.3.
Charter Communications: "Outcome of Email Thread [100b-e-NR-unlic-NRU-InitAccessProc-02]," 3GPP TSG RAN WG1 Meeting #100b-e, R1-2002850, eMeeting, Apr. 20-30, 2020, Apr. 3, 2020 (Apr. 4, 2020), section 3.1, 11 pages.
International Search Report and Written Opinion—PCT/CN2020/107665—ISA/EPO—Apr. 26, 2021.
Nokia, et al., "On DL Signals and Channels," 3GPP TSG RAN WG1 Meeting #99, R1-1912279, Reno, Nevada, U.S.A, Nov. 18-22, 2019, Apr. 3, 2020 (Mar. 4, 2020), the whole document, 16 pages.

* cited by examiner

TECHNIQUES FOR TRANSMISSION OF MESSAGE A (MSGA) IN AN IDLE PERIOD WITHIN A WIRELESS COMMUNICATION SYSTEM

CROSS-REFERENCE TO RELATED APPLICATIONS

This application is a 35 U.S.C. § 371 National Phase Application of PCT Application No. PCT/CN2020/107665 filed Aug. 7, 2020, entitled "TECHNIQUES FOR TRANSMISSION OF MESSAGE A (MSGA) IN AN IDLE PERIOD WITHIN A WIRELESS COMMUNICATION SYSTEM," which is assigned to the assignee hereof and hereby incorporated by reference herein.

TECHNICAL FIELD

Aspects of the present disclosure relate generally to wireless communication systems, and more particularly, to a transmission of random access channel (RACH) related information in an idle period in a wireless communication system.

DESCRIPTION OF THE RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method may include receiving, from a network entity via system information or radio resource control (RRC) signaling, a fixed frame period (FFP) defining an idle period. The method may further include determining that a physical random access channel (PRACH) occasion (RO) resource or a physical uplink shared channel (PUSCH) occasion (PO) resource overlaps with the idle period of the FFP. The method may further include mapping the RO resource to the PO resource based on determining that the RO resource or the PO resource overlaps with the idle period of the FFP. The method may further include performing a random access channel (RACH) procedure according at least to the mapping of the RO to the PO.

In some implementations, mapping the RO to the PO may include grouping a first set of RO resources and PO resources that fall outside the idle period of the FFP, and grouping a second set of RO resources and PO resources that overlap the idle period of the FFP.

In some implementations, mapping the RO to the PO may include mapping at least a portion of RO resources from the first set to at least a portion of PO resources from the first set, and mapping at least a portion of RO resources from the second set to at least a portion of PO resources from the second set, where the mapping of the first set occurs prior to the mapping of the second set.

In some implementations, at least the portion of RO resources from the second set may be mapped to a number of synchronization signal block (SSB) resources.

In some implementations, at least the portion of RO resources from the first set may be mapped to at least the portion of PO resources from the first set and at least the portion of RO resources from the second set are mapped to at least the portion of PO resources from the second set in accordance with an increasing order of frequency resource indexes for frequency multiplexed POs, demodulation reference signal (DMRS) indexes within a single PO, time resource indexes for time multiplexed POs within a PUSCH slot, and indexes for PUSCH slots.

In some implementations, the method may further include configuring a common PUSCH configuration set for a first PRACH configuration and a second PRACH configuration.

In some implementations, a start time of a PRACH slot of the first PRACH configuration and a start time of a second PRACH slot of the second PRACH configuration may be offset according to a single time offset value.

In some implementations, mapping the RO to the PO may include grouping a first set of PO resources that fall outside the idle period of the FFP, and grouping a second set of PO resources that overlap with the idle period of the FFP, the first set of PO resources and the second set of PO resources associated with a PUSCH configuration.

In some implementations, mapping the RO to the PO may include mapping the valid RO resources associated with the first PRACH configuration to the first set of valid PO resources that fall outside the idle period of the FFP, and mapping the valid RO resources associated with the second PRACH configuration to the second set of valid PO resources that overlap with the idle period of the FFP.

In some implementations, the valid RO resources associated with the first PRACH configuration may be mapped to the first set of valid PO resources that fall outside the idle period of the FFP and the valid RO resources associated with the second PRACH configuration is mapped to the second set of valid PO resources that overlap with the idle period of the FFP in accordance with an increasing order of frequency resource indexes for frequency multiplexed POs, DMRS indexes within a single PO, time resource indexes for time multiplexed POs within a PUSCH slot, and indexes for PUSCH slots.

In some implementations, the method may further include configuring a first PUSCH configuration set for a first PRACH configuration and a second PUSCH configuration set for a second PRACH configuration.

In some implementations, a start time of a PRACH slot of the first PRACH configuration may be offset according to a first time offset value and a start time of a second PRACH slot of the second PRACH configuration may be offset according to a second time offset value same or different from the first time offset value.

In some implementations, the second PUSCH configuration set includes a number of PO resources configured within the idle period of the FFP.

In some implementations, mapping the RO to the PO may include mapping the valid RO resources associated with the first PRACH configuration and the valid PO resources associated with the first PUSCH configuration set, and mapping the valid RO resources associated with the second PRACH configuration and the valid PO resources associated with the second PUSCH configuration set.

In some implementations, the valid RO resources associated with the first PRACH configuration and the valid PO resources associated with the first PUSCH configuration set are mapped, and the valid RO resources associated with the second PRACH configuration and the valid PO resources associated with the second PUSCH configuration set are mapped in accordance with an increasing order of frequency resource indexes for frequency multiplexed POs, DMRS indexes within a single PO, time resource indexes for time multiplexed POs within a PUSCH slot, and indexes for PUSCH slots.

In some implementations, mapping the RO resource to the PO resource may be further based on an association pattern period including one or more association periods defining a minimum repeat time for a pattern between an RO and a SSB index.

In some implementations, the association pattern period may be common for each group of RO resources and PO resources.

In some implementations, the association pattern period may correspond to a maximum associated pattern period across each group of RO resources and PO resources.

In some implementations, the association pattern period may correspond to a first associated pattern period for a first group of RO resources and PO resources.

In some implementations, the association pattern period may be different for each group of RO resources and PO resources.

In some implementations, one of the RO resource or the PO resource may be mapped to a SSB.

In some implementations, performing the RACH procedure may include one of performing a four-step RACH procedure or a two-step RACH procedure.

In some implementations, the UE supports ultra-reliable low-latency communication (URLLC) communication or industrial internet of things (IIoT).

In a further example, an apparatus for wireless communication is provided that includes a transceiver, a memory configured to store instructions, and one or more processors communicatively coupled with the transceiver and the memory. The one or more processors are configured to execute the instructions to perform the operations of the methods described herein. In another aspect, an apparatus for wireless communication is provided that includes means for performing the operations of methods described herein. In yet another aspect, a non-transitory computer-readable medium is provided including code executable by one or more processors to perform the operations of the methods described herein.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

Figure 1:
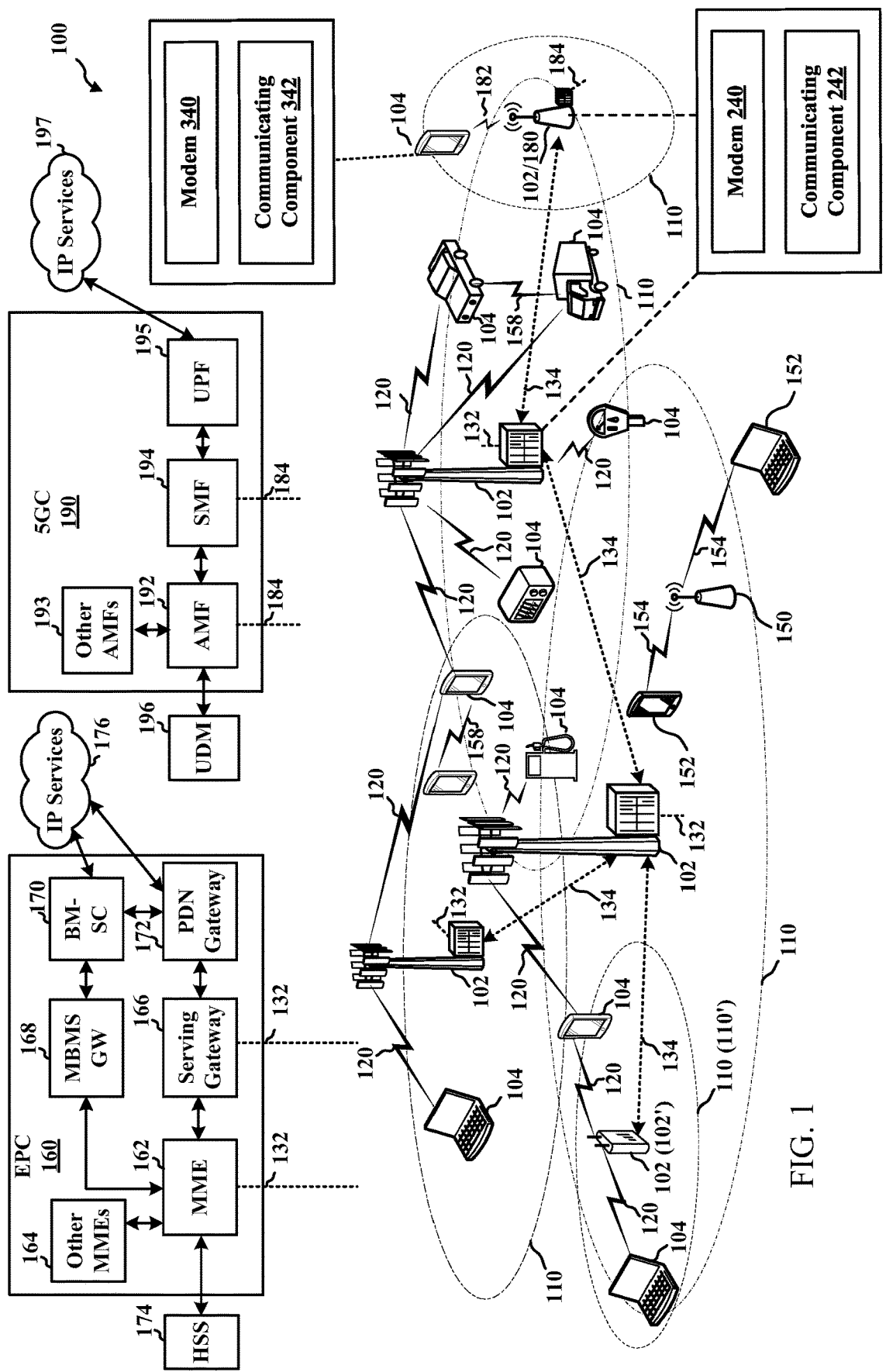
FIG. 1 illustrates an example of a wireless communication system.

An Appendix is included that is part of the present application and provides additional details related to the various aspects of the present disclosure.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

The described features generally relate to wireless communication systems, and more particularly to transmission of random access channel (RACH) related information such as Message A (MsgA) during an idle period. Specifically, a RACH procedure involves a sequence of processes between a user equipment (UE) and a network (i.e., gNB) in order for the UE to acquire synchronization and obtain specified identification for the radio access communication. In some wireless communication systems, physical random access channel (PRACH) or physical uplink shared channel (PUSCH) resources overlapped with an idle period of a fixed frame period (FFP) may be considered invalid. In such cases, a synchronization signal block (SSB) cannot be mapped to these PRACH occasions (RO) or PUSCH occasions (POS). For impacted UEs, to increase the probability for a successful PRACH or MsgA PUSCH transmission, ROs or POs that overlap with the idle period of the FFP can be otherwise considered as valid, and thus an SSB can be mapped to the ROs or POs.

Accordingly, for UEs supporting ultra-reliable low-latency communication (URLLC) or industrial internet of things (IIoT) services, which may have stringent standards on latency and reliability, a UE may benefit from using resources associated with the idle period for UE initiated channel occupancy time (COT). For example, the idle period resources may be used for four-step RACH or MsgA for two-step RACH. To accomplish such utilization of idle period resources, the present disclosure sets forth techniques for mapping ROs-to-POs without impacting a class of UEs operating according to previous communication standards or schemes. In a further implementation, a UE may first perform RO-to-PO mapping for a first group of ROs and POs not overlapping the idle period of the FFP, and then perform RO-to-PO mapping for a second group of ROs and POs overlapping the idle period of the FFP to apply an SSB-to-RO mapping based on the RO-to-PO mapping during the idle period, thereby leveraging available resources for RACH procedures. In another implementation, a UE may use a PUSCH configuration for multiple PRACH configurations to similarly leverage available resources during the idle period of the FFP for improved RACH procedures (i.e., MsgA transmissions).

Particular implementations of the subject matter described in this disclosure can be implemented to realize one or more of the following potential advantages. For example, in some wireless communication systems such as URLLC or IIOT, where latency and reliability standards may be stringent, use of any available resource for improved RACH procedures may be beneficial. As such, the idle period of an FFP includes resources that may go unutilized unless UEs use such available resources for RACH procedures (i.e., PRACH: four-step RACH or MsgA: two-step RACH). Consequently, by utilizing idle period resources, the UE may improve network acquisition via RACH.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include or otherwise correspond to gNBs 180. Further, in some aspects, the base stations 102 may each include multiple TRPs.

In one example, some nodes such as base station (BS) 102/gNB 180, may have a modem 240 and communicating component 242 for communicating with UEs 104, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for transmitting RACH related information (i.e., MsgA) during an idle period of an FFP, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102! may have a coverage area 110! that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102! may operate in a licensed or an unlicensed frequency spectrum. When operating in an unlicensed frequency spectrum, the small cell 102! may employ NR and use the same 5 GHz unlicensed frequency spectrum as used by the Wi-Fi AP 150. The small cell 102!, employing NR in an unlicensed frequency spectrum, may boost coverage to or increase capacity of the access network.

A base station 102, whether a small cell 102! or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 4A:
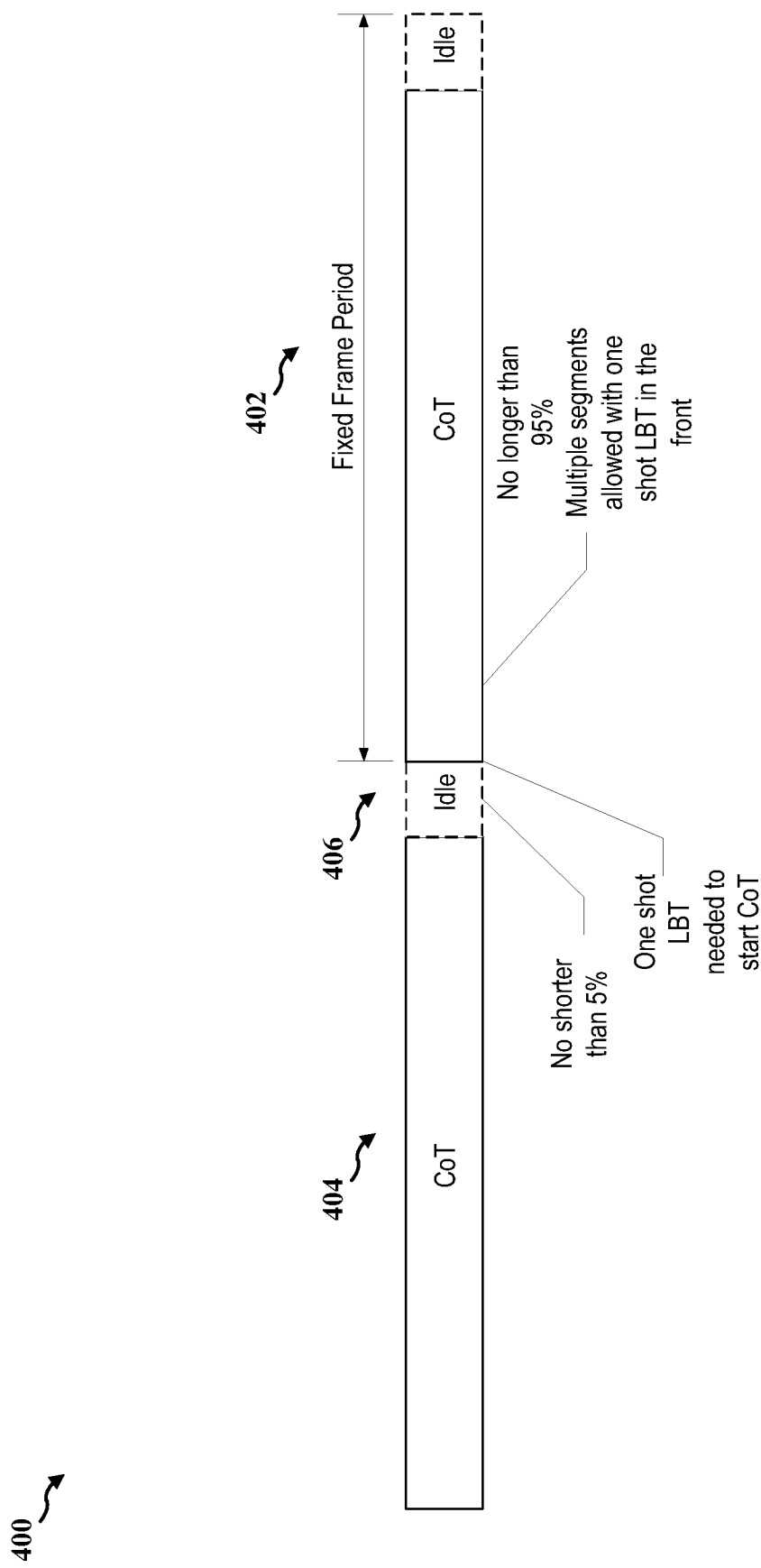
FIG. 4A illustrates a fixed frame period (FFP) configuration for a frame based equipment (FBE) mode of operation.
Figure 4B:
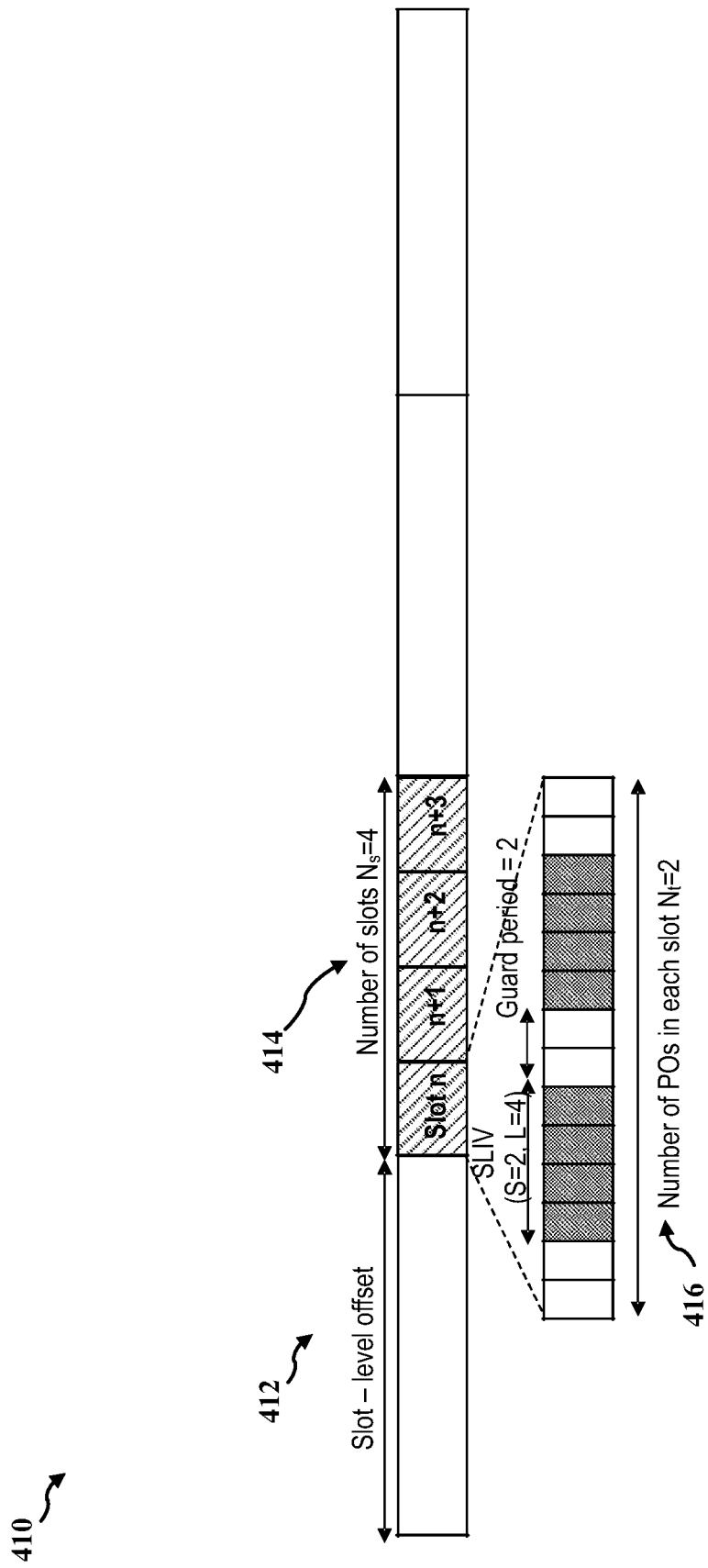
FIG. 4B illustrates a message A (MsgA) time domain resource configuration.
Figure 4C:
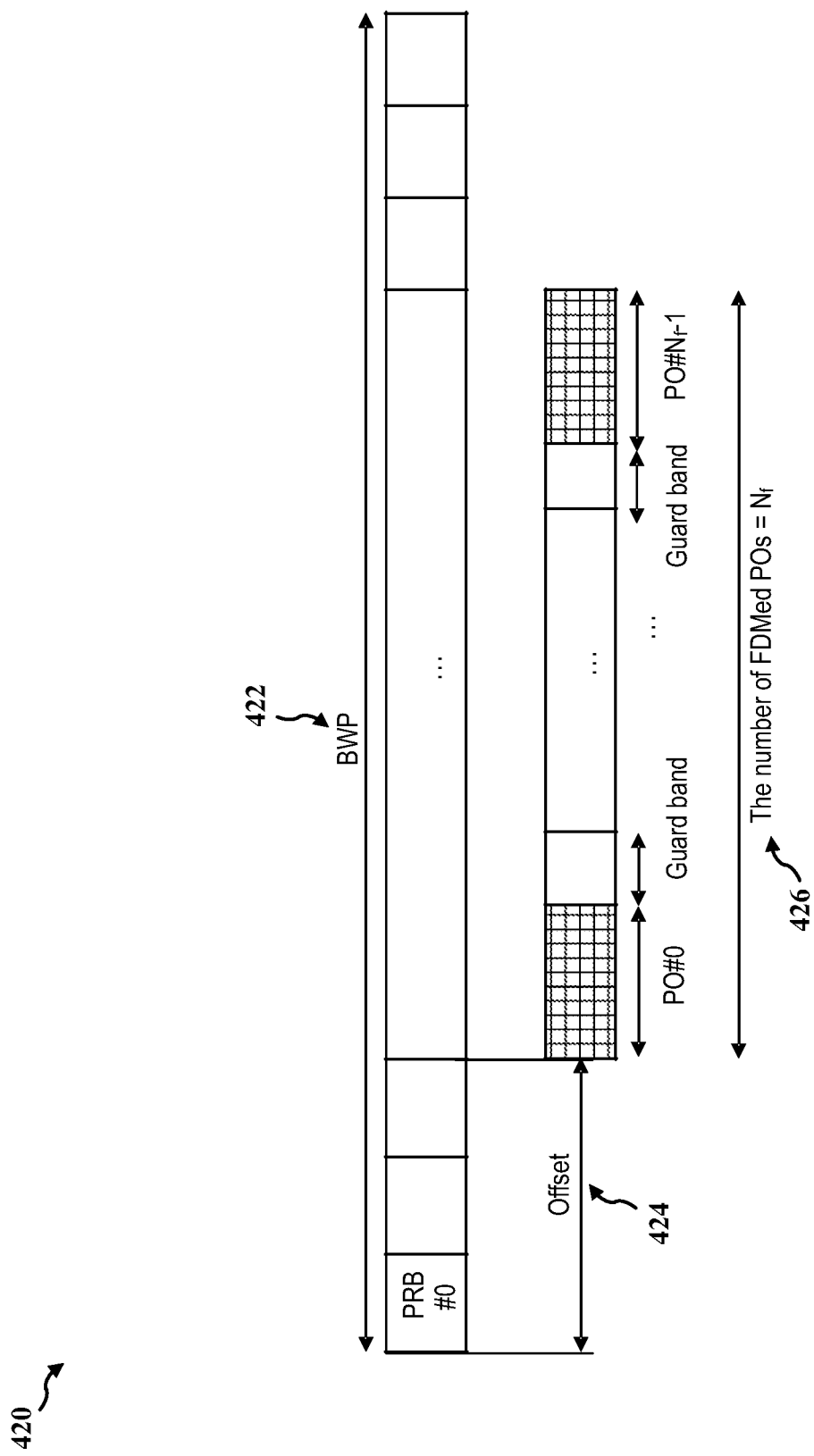
FIG. 4C illustrates a MsgA frequency domain resource configuration.
Figure 4D:
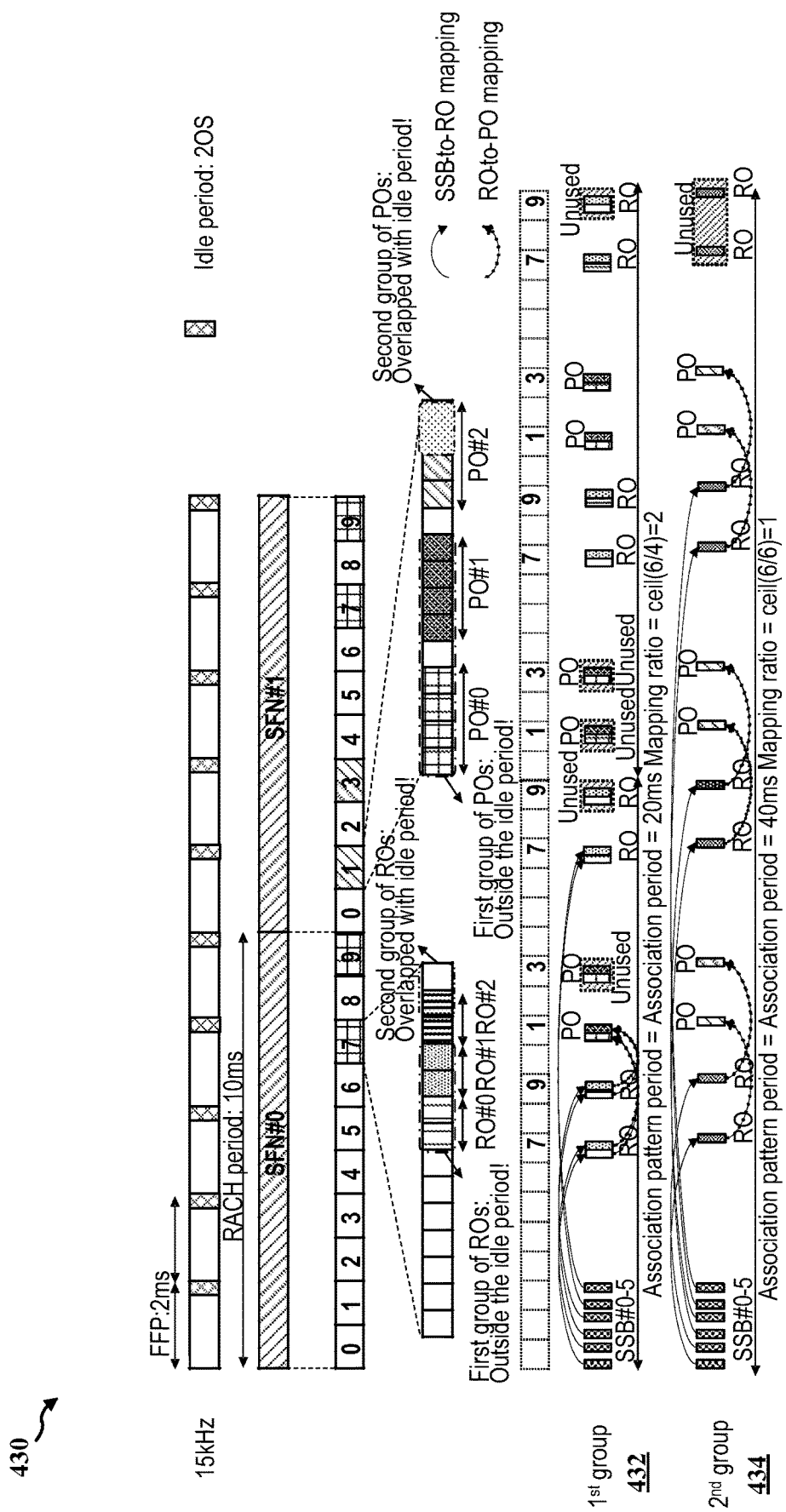
FIG. 4D is an example physical random access channel (PRACH) occasion (RO) to physical uplink shared channel (PUSCH) occasion (PO) mapping.
Figure 4E:
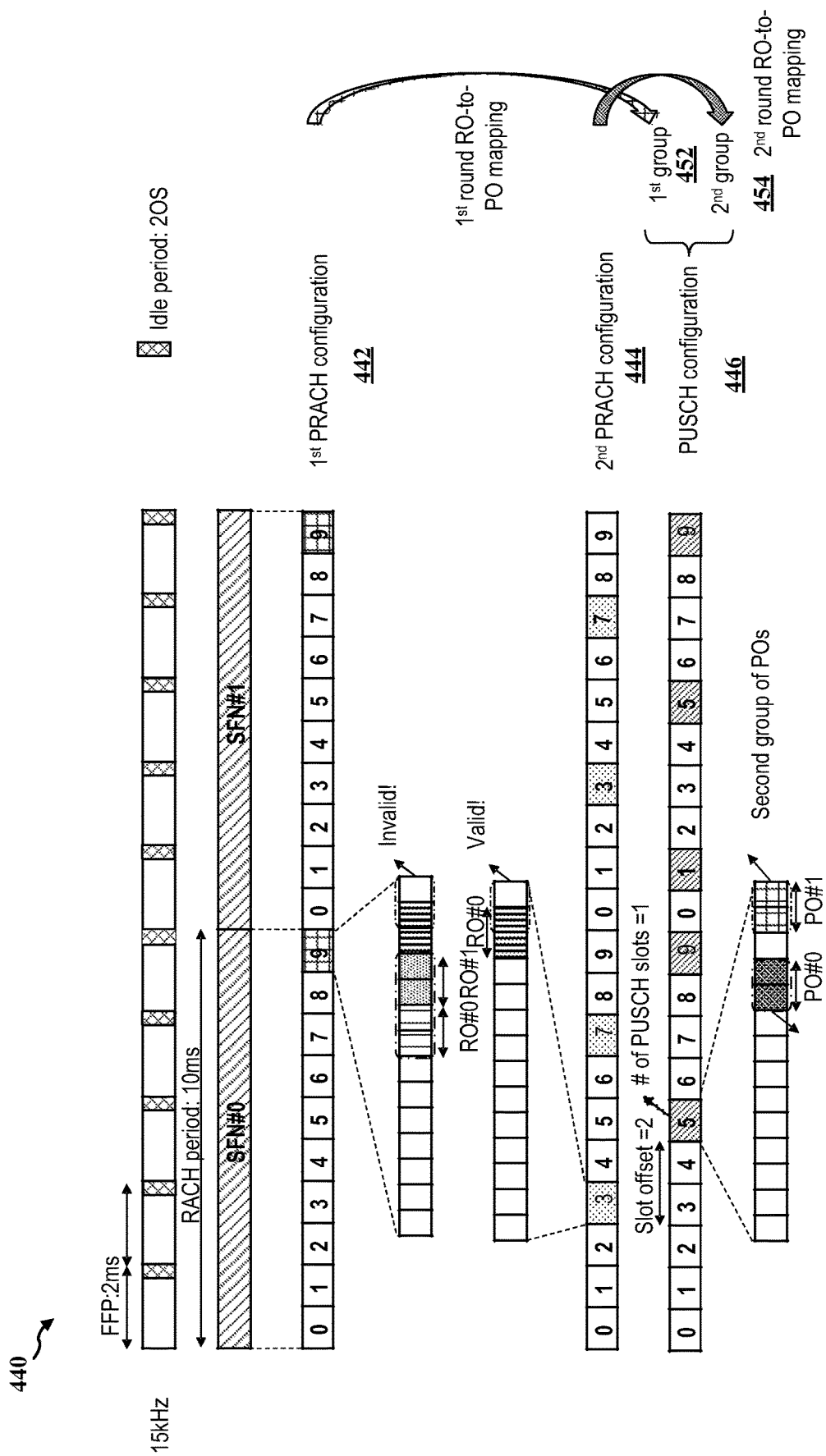
FIG. 4E is an example of a PUSCH configuration for two PRACH configurations when a common PUSCH configuration set is configured.
Figure 4F:
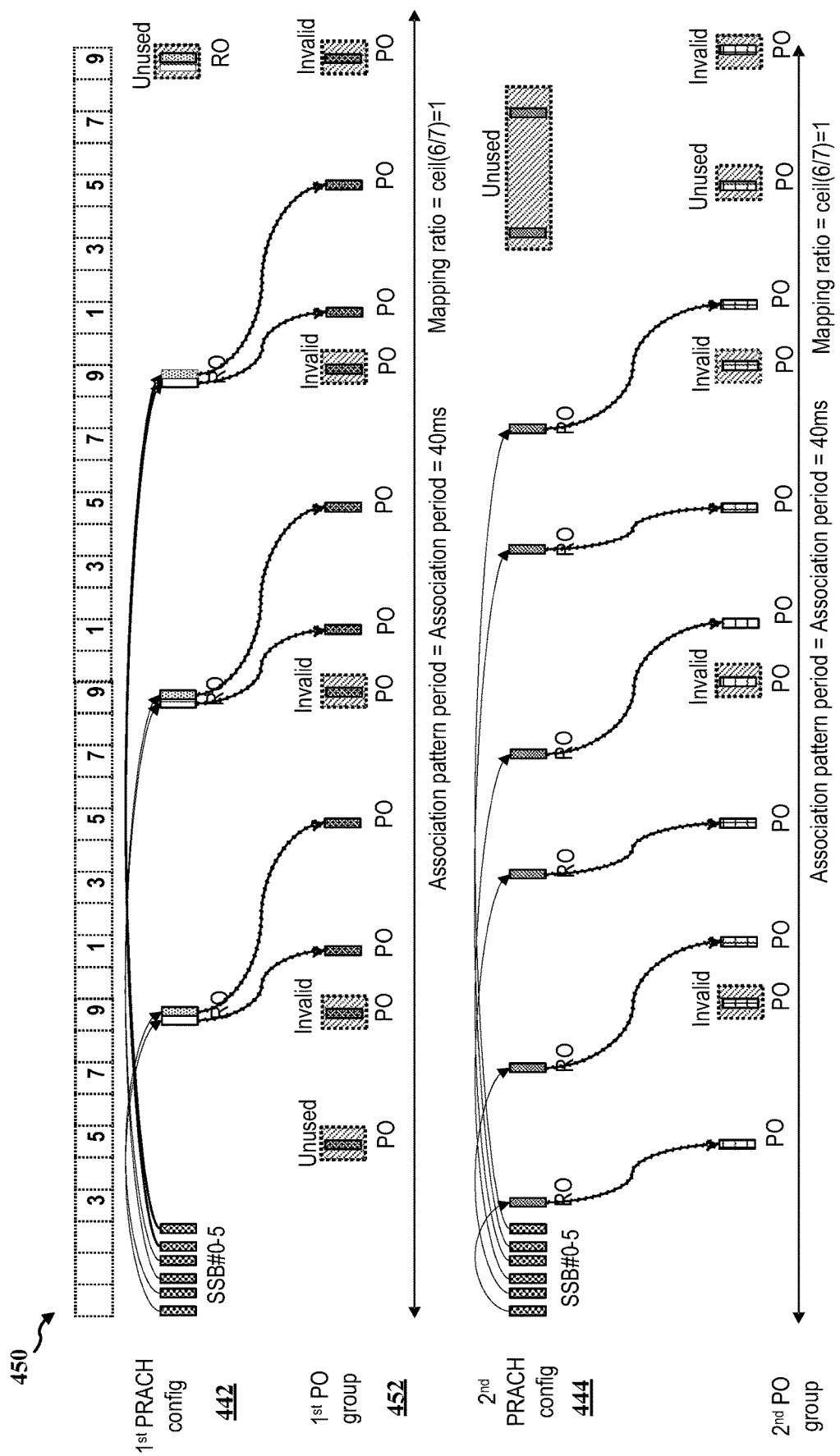
FIG. 4F is a further example of a PUSCH configuration for two PRACH configurations when a common PUSCH configuration set is configured.
Figure 4G:
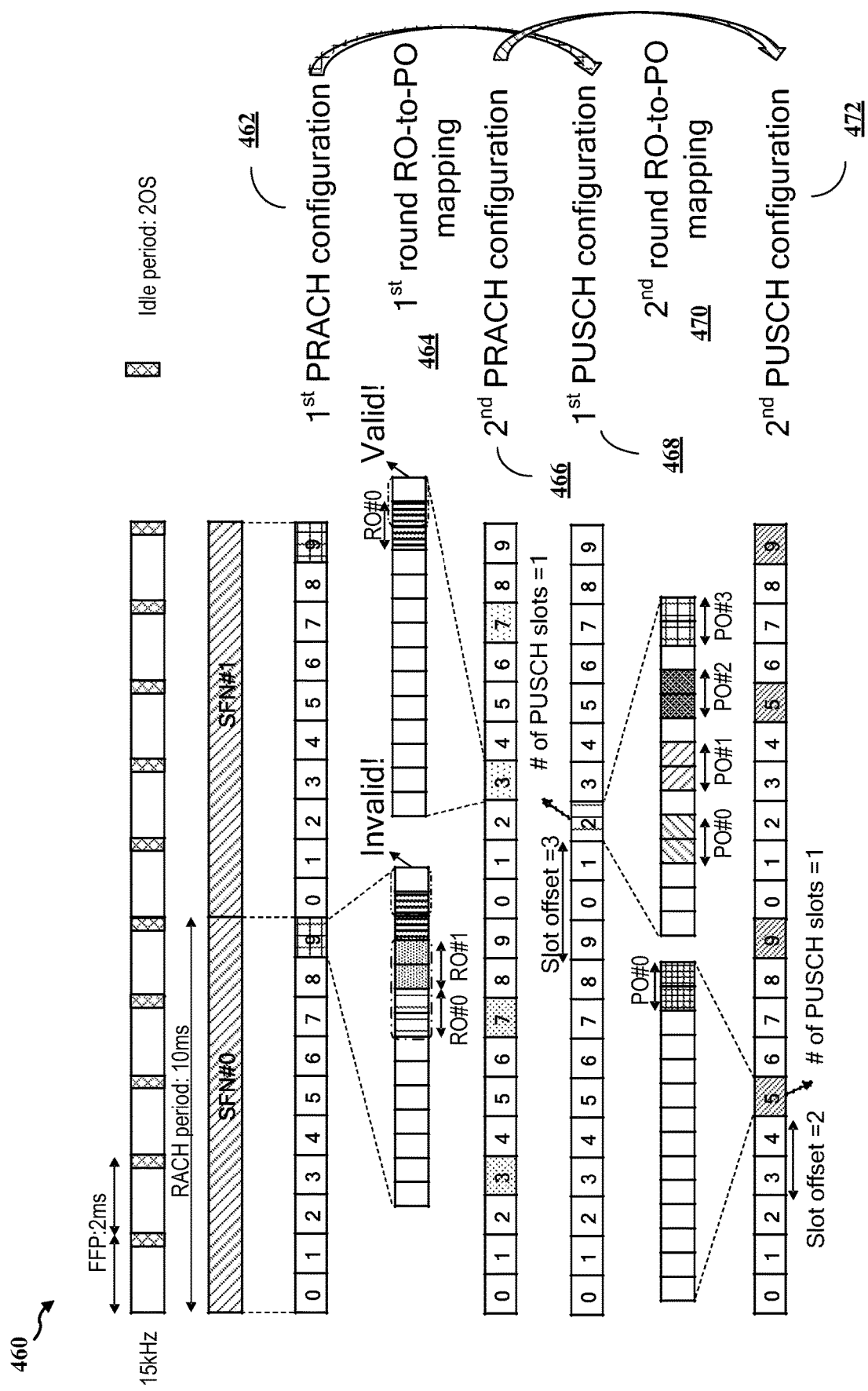
FIG. 4G is an example of a PUSCH configuration for two PRACH configurations when separate PUSCH configuration sets are configured.
Figure 4H:
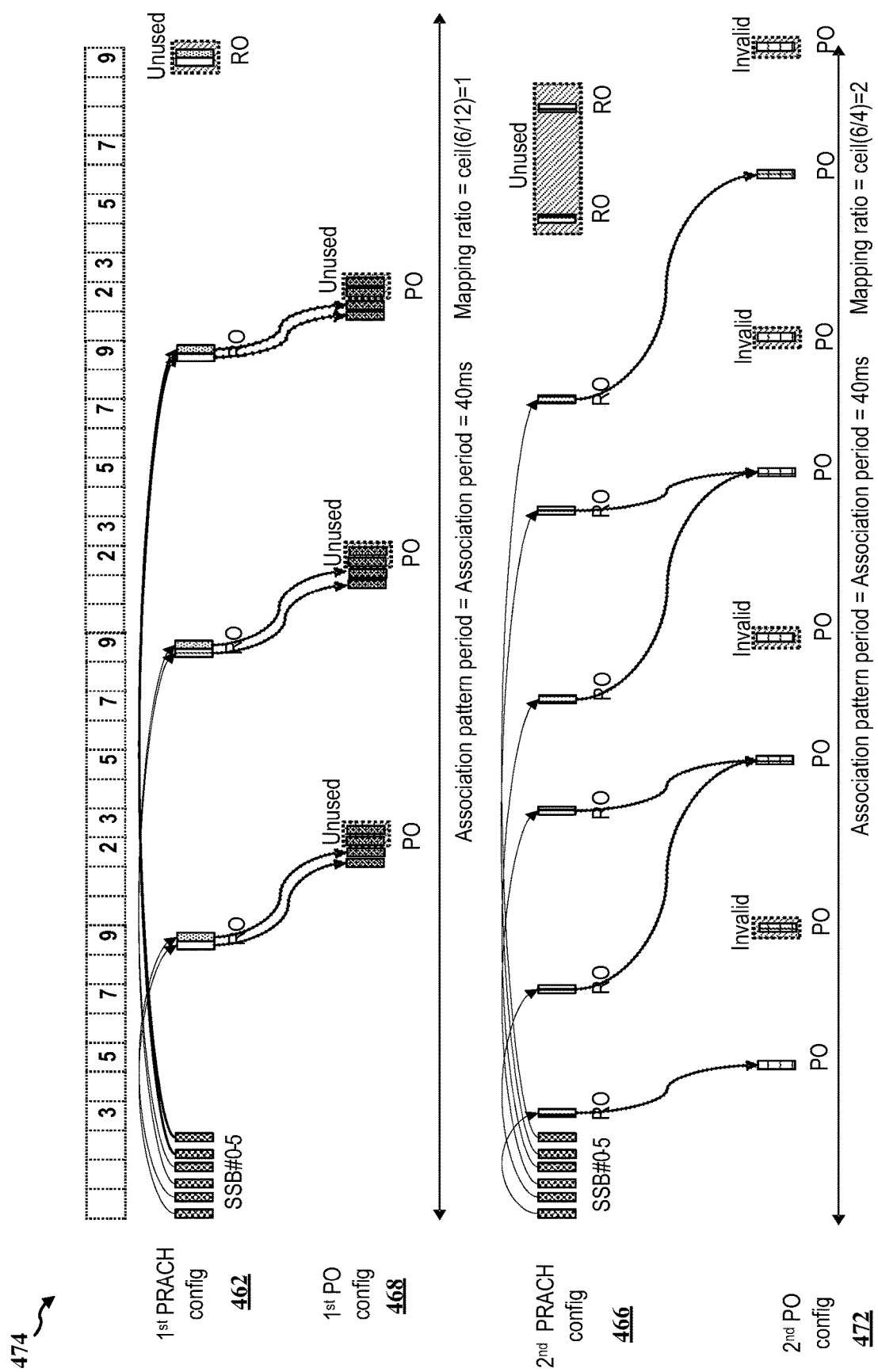
FIG. 4H is a further example of a PUSCH configuration for two PRACH configurations when separate PUSCH configuration sets are configured.
Figure 4I:
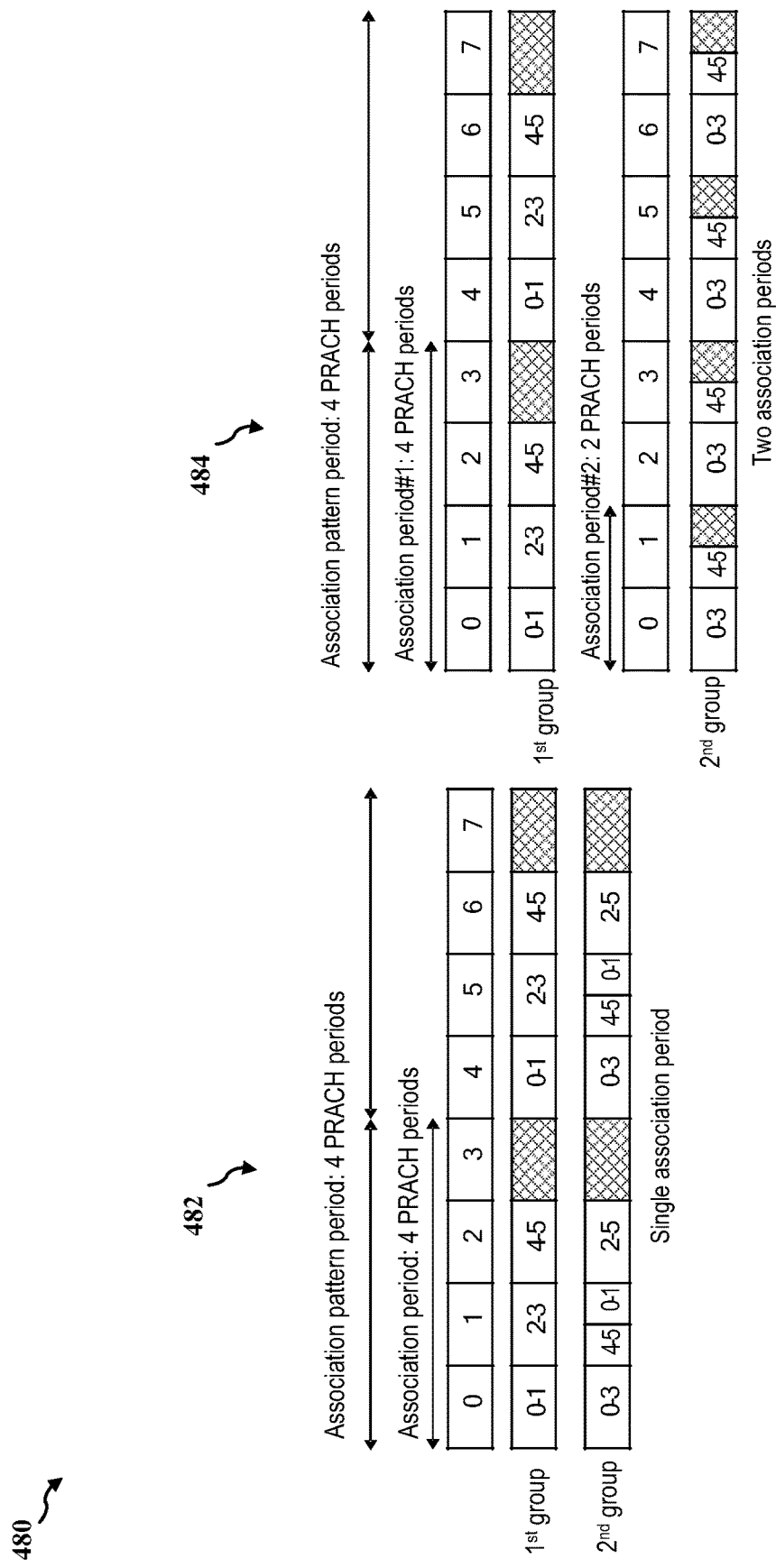
FIG. 4I is an example of a single association pattern period used for two rounds RO-to-PO mapping.
Figure 4J:
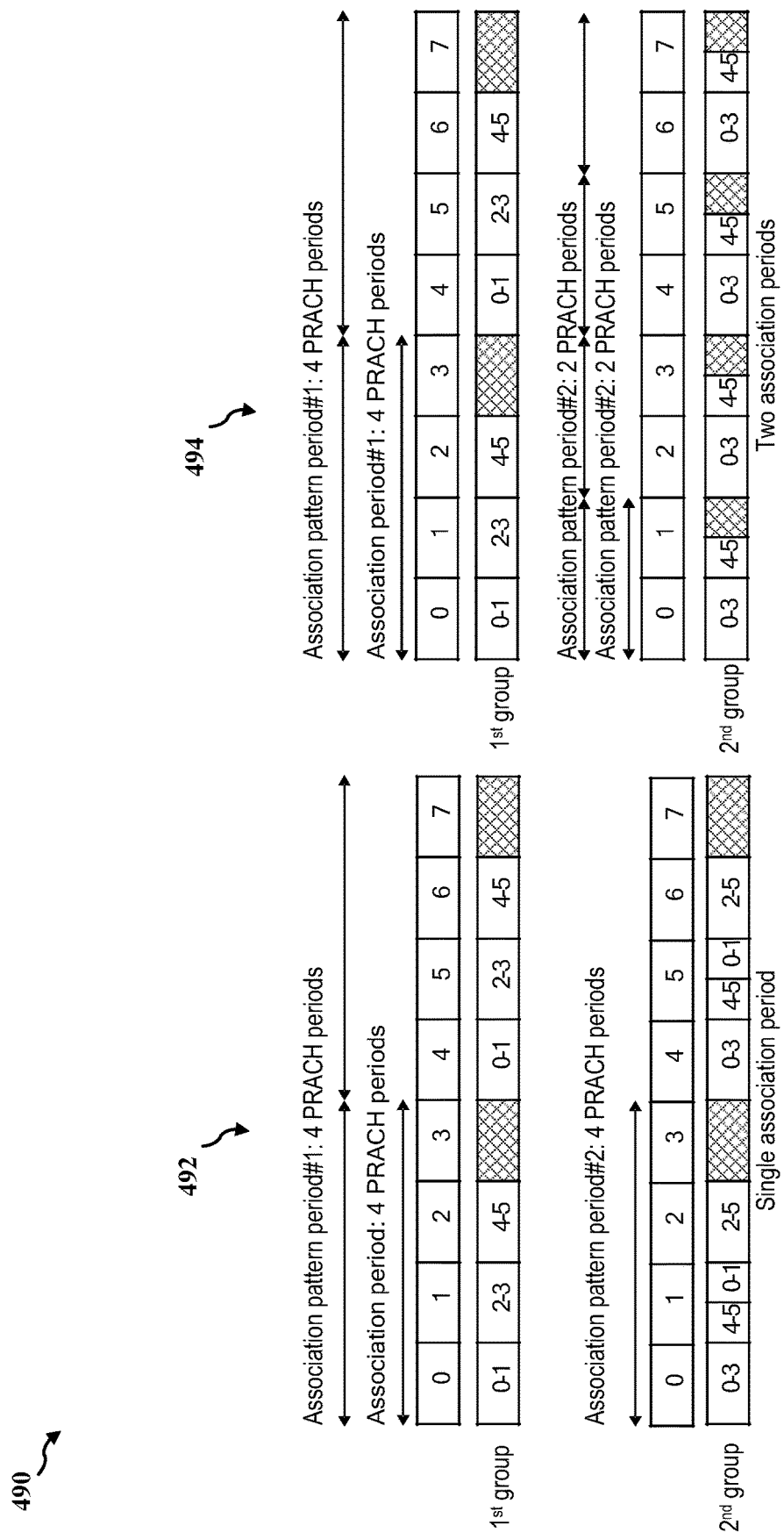
FIG. 4J is an example of two association pattern periods used for two rounds RO-to-PO mapping.
Figure 5:
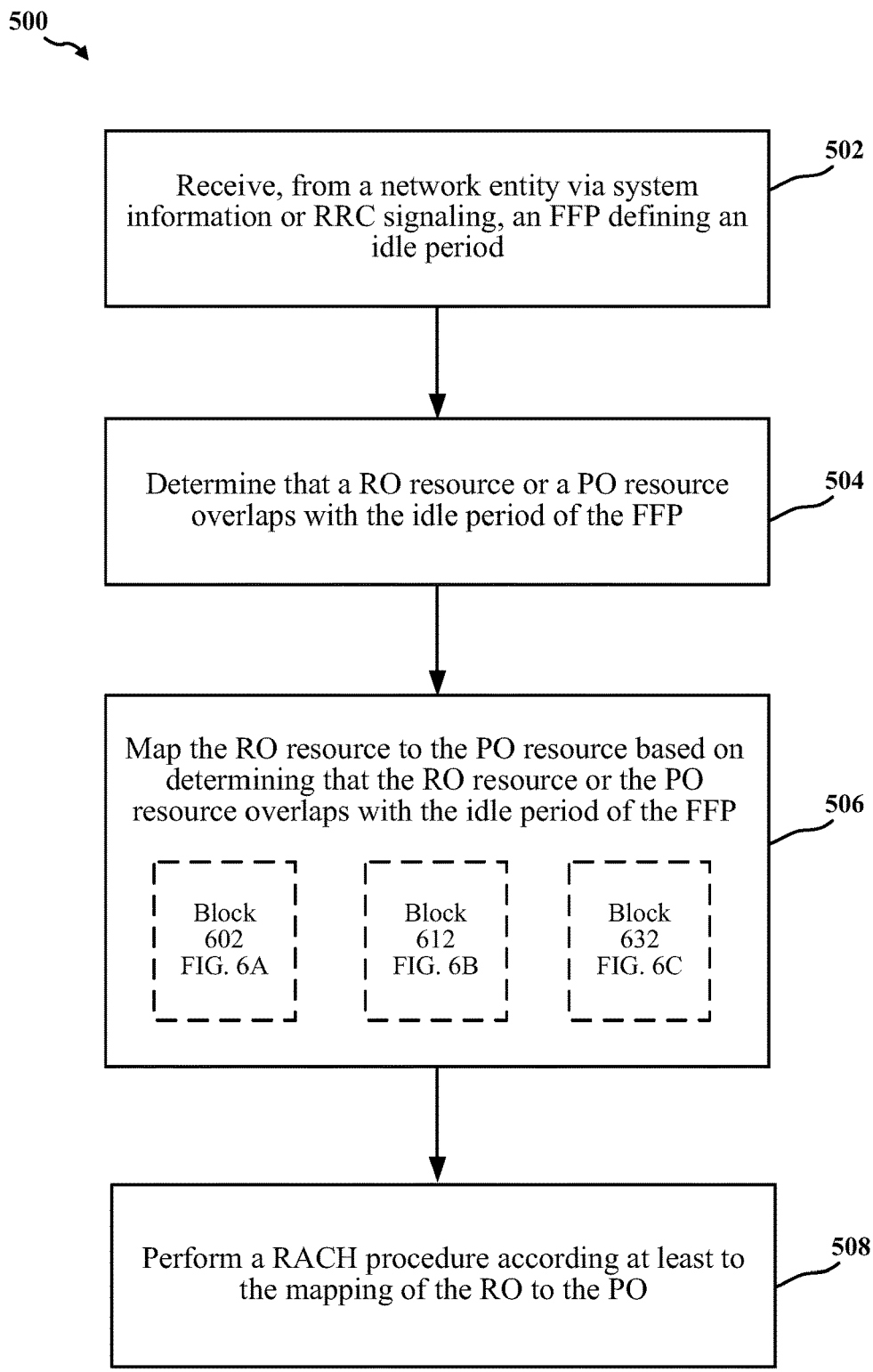
FIG. 5 is a flowchart of an example method of wireless communication at an apparatus of a UE.

Turning now to FIGS. 2-7, aspects are depicted with reference to one or more components and one or more methods that may perform the actions or operations described herein, where aspects in dashed line may be optional. Although the operations described below in FIGS. 5 and 6 are presented in a particular order or as being performed by an example component, it should be understood that the ordering of the actions and the components performing the actions may be varied, depending on the implementation. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
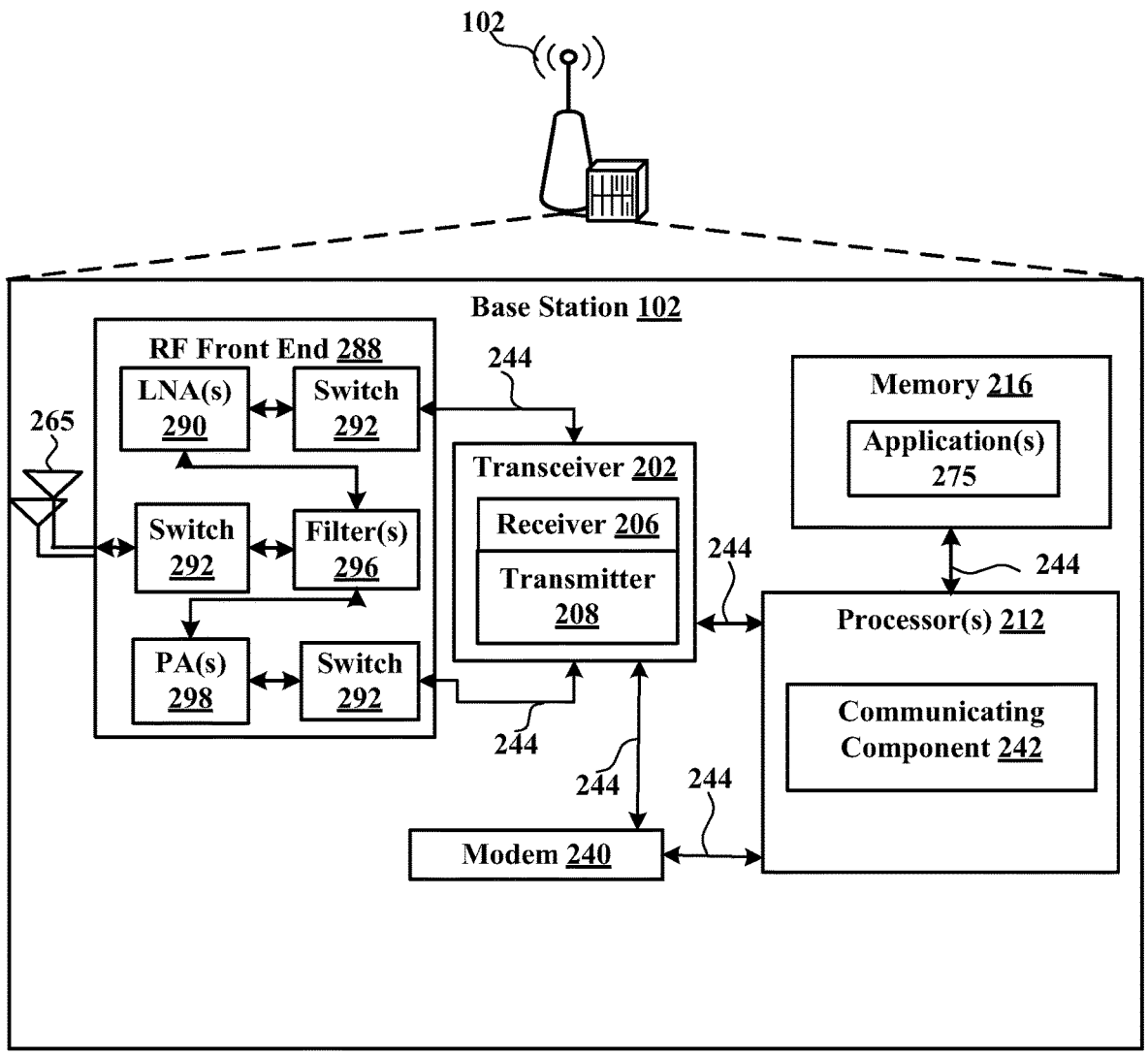
FIG. 2 is a block diagram illustrating an example of a network entity (also referred to as a base station (BS)).

FIG. 2 is a block diagram illustrating an example of a network entity (also referred to as a base station (BS) that may have multiple TRPs). The base station 102 (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for communicating with UEs 104.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, EchIo, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

Figure 3:
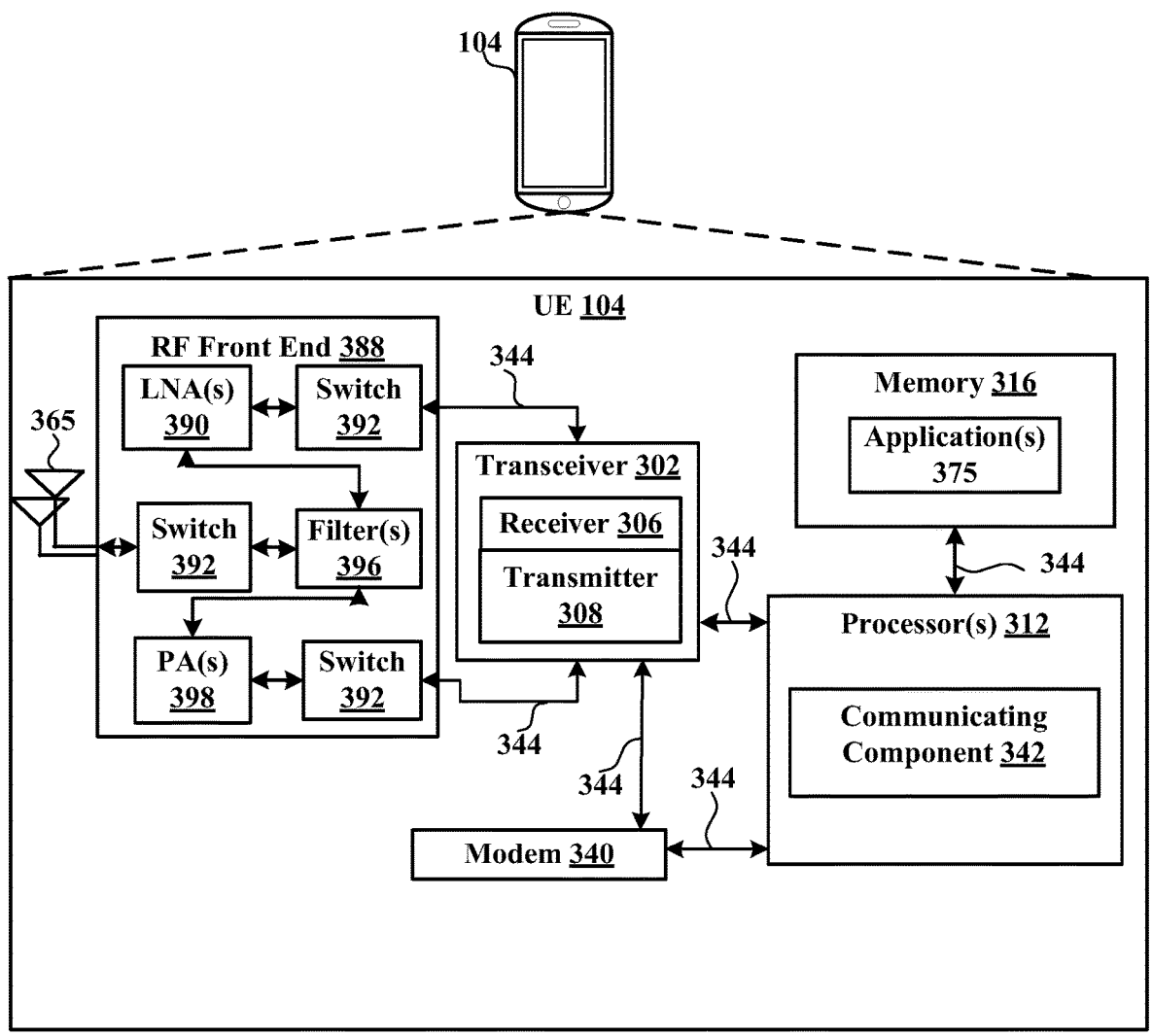
FIG. 3 is a block diagram illustrating an example of a user equipment (UE).

FIG. 3 is a block diagram illustrating an example of a user equipment (UE) 104. The UE 104 may include a variety of components, some of which have already been described above and are described further herein, including components such as one or more processors 312 and memory 316 and transceiver 302 in communication via one or more buses 344, which may operate in conjunction with modem 340 and configured for transmitting RACH related information (i.e., MsgA) during an idle period of an FFP.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

FIG. 4A illustrates an FFP configuration 400 for a frame based equipment (FBE) mode of operation. The FFP configuration 400 may be associated with a frame based equipment (FBE) mode of operation. In some aspects, an FBE mode may be indicated in an remaining system information (RMSI) (i.e., for semi-static channel access). Further, the FFP configuration 400 may be included in system information bit one (SIB1). In other aspects, the FFP configuration 400 may be signaled for a UE with UE-specific RRC signaling for FBE secondary cell (SCell) scenarios.

For example, the FFP configuration 400 may be composed of an FFP 402 including a channel occupancy time (CoT) 404, which may correspond to a maximum continuous transmission time after channel sensing. The CoT 404 may be no longer than ninety five percent of the FFP 402. In some aspects, multiple segments may be allowed with one short listen-before-talk (LBT) at the beginning. Further, the FFP 402 may further include an idle period 406 adjacent to the CoT 404. The idle period 406 may be no shorter than five percent of the FFP 402. In some aspects, a single shot LBT may be used to start the CoT 404. A PUSCH resource may be considered invalid if overlapping with the idle period 406 of a FFP 402 when an FBE operation is indicated. A PUSCH occasion is valid if it is not overlapping in time and frequency with any PRACH occasion associated with either a Type-1 random access procedure or a Type-2 random access procedure.

In some implementations, the FFP 402 may be restricted to values of 1 ms, 2 ms, 2.5 ms, 4 ms, 5 ms, 10 ms, which may include the idle period 406. The starting positions of the FFP 402 within every two radio frames may start from an even radio frame and may be given by 'I*P', where I=(0, 1, . . . , 20/P−1), and where P may be the FFP 402 in milliseconds. The idle period 406 for a given subcarrier spacing (SCS) may be equal to a ceil (minimum idle period allowed by regulations/Ts), where the minimum idle period allowed may equal a maximum of 5% of FFP, 100 us. Further, 'Ts' may be the symbol duration for the given SCS. In some aspects, ceil may be a minimum integer that is equal to or larger than a given value or function.

In some aspects, MsgA may be configured for PUSCH. For each radio resource control (RRC) state, up to two MsgA PUSCH configurations can be pre-configured by the network in an initial/active uplink bandwidth part (BWP). Some group-specific configuration parameters may include a slot-level offset between MsgA PRACH and MsgA PUSCH, a number of frequency division multiplexed (FDMed) MsgA POs, time domain resource allocation (TDRA) and frequency division resource allocation (FDRA), a modulation and coding scheme (MCS) associated with a transport block size (TB S), a preamble to PUSCH mapping ratio, a DMRS resource configuration (i.e., sequence and port), an intra-slot frequency hopping (which may be configurable), a physical resource block (PRB)-level guard band (which may be configurable), and a symbol-level guard period after MsgA PUSCH (which may be configurable).

FIG. 4B illustrates a MsgA time domain resource configuration 410. For the MsgA time domain resource configuration 410, a number of parameters may be configured per MsgA PUSCH configuration. For example, in one example, a slot-level offset 412 between MsgA PRACH and MsgA PUSCH may be configured. Further, a number of slots 414 (i.e., in active UL BWP numerology) including one or multiple POs, where each slot has the same time domain resource allocation may be configured. Additionally, a number of time domain POs in each slot 416 may be configured where the POs including a guard period are contiguous in the time domain within a slot. Also, a start and length indicator value (SLIV) for the time domain allocation for PDSCH where the start symbol of the first PO in each slot, and the number of occupied symbols of each PO excluding the guard period in the time domain may be configured. Further configurations may include a PUSCH mapping type A or B, and configurable guard period.

FIG. 4C illustrates a MsgA frequency domain resource configuration 420. For a MsgA frequency domain resource configuration 420, a number of parameters may be configured per MsgA PUSCH configuration. In a first example, a frequency starting point with respect to the first PRB of the active UL BWP 422, which may be referred to as the offset 424. Further, a number of FDMed POs 426 may be configured where POs (i.e., including guard band or guard period) under the same MsgA PUSCH configurations may be consecutive in frequency domain. Further, a number of interlaces or number of PRBs per PO and a guard band may be configured.

In some implementations, RO-to-PO mapping may be employed to facilitate RACH procedures and PUSCH transmissions. For example, a preamble to PO mapping ratio may include a single value per configuration, which may implicitly be derived by a total number of valid preambles and valid POs in the SSB-to-RO association pattern period. In some aspects, a network-based implementation may ensure the value does not vary across different periods. Further, in some aspects, the 'M' preambles may be mapped to one PO such that M=ceiling (N_pre/N_pru), where N_pre and N_pru may respectively be the total numbers of valid preambles and valid POs in the SSB-to-RO association pattern period.

Additionally, each M, where M may be greater than or equal to one (M>=1), consecutive PRACH preambles may be mapped to valid POs in a specific order. First, in increasing order of frequency resource indexes for frequency multiplexed POs. Second, in an increasing order of DMRS indexes within a single PO. For instance, DMRS indexes within a single PO may be in increasing order of DMRS port first and DMRS sequences second. Third, in an increasing order of time resource indexes for time multiplexed PUSCH occasions within a PUSCH slot. Fourth, in an increasing order of indexes for PUSCH slots.

However, in some current wireless communication systems, an idle period 406 of an FFP 402 may not be supported. As described herein, UEs operating according to URLLC or IIoT may benefit from transmission of ROs or POs, or both, during the idle period 406. Specifically, for UEs supporting URLLC or IIOT service, which may include strict parameters on latency and reliability, the UE operation may be improved if the idle period 406 could be used for UE initiated CoT 404, for example, for PRACH: four-step RACH or MsgA: two-step RACH. Nonetheless, as noted above, in some current wireless communication systems, PRACH/PUSCH resources overlapped with idle period may be considered invalid, thereby precluding mapping of the SSBs to the ROs and POs. For some UEs, to increase the probability for PRACH or MsgA PUSCH transmission, these ROs or POs may be considered valid, and thus SSBs can be mapped to these ROs or POs. As such, the present implementations provide techniques for mapping the SSBs to ROs or ROs to POs without impacting UEs.

FIG. 4D is an example RO-to-PO mapping according to a first RO-to-PO mapping implementation 430. In particular, the ROs and POs may be divided into two groups. A first group 432 may include ROs and POs outside the idle period 406 in an FFP 402 (i.e., valid ROs and POs in current wireless communication systems). A second group 434 may include ROs and POs which may be overlapped with the idle period 406 in the FFP 402. For instance, the first group 432 may include RO #0 and RO #1 outside the idle period 406, which may be mapped with PO #0 and PO #1 falling outside the idle period 406. Similarly, the second group 434 may include RO #2 overlapped with the idle period 406, which may be mapped to PO #2 overlapped with the idle period 406.

The UE may then perform two rounds RO-to-PO mapping such that the UE first performs RO-to-PO mapping for the first group 432 of ROs and POs and then perform RO-to-PO mapping for the second group 434 of ROs and POs. For example, for the first group 432, the association pattern period for the first group 432 is 20 ms, the UE may map RO #0 and RO #1 falling outside the idle period 406 in subframe #7 and subframe #9 of SFN #0, RO #0 and RO #1 in subframe #7 and subframe #9 of SFN #1 with PO #0 and PO #1 falling outside the idle period 406 in subframe #1 and subframe #3 of SFN #1. Further, the number of valid ROs in the association pattern period of the first group 432 is 6, and the number of valid POs in the association pattern period is 4. The UE derives the mapping ratio as ceil (6/4)=2. Further, the UE maps the RO #0 and RO #1 in subframe #7 of SFN #1 to PO #0 in subframe #1 of SFN #1 and maps the RO #0 and RO #1 in subframe #9 of SFN #1 to PO #1 in subframe #1 of SFN #1. After the mapping, PO #0 and PO #1 in subframe #3 of SFN #1 is not association with any ROs thus PO #0 and PO #1 is considered as invalid POs.

For the second group 434, the association pattern period is 40 ms, the UE may map RO #2 overlapping with the idle period 406 in subframe #7 and subframe #9 of SFN #0, RO #2 in subframe #7 and subframe #9 of SFN #1, RO #2 in subframe #7 and subframe #9 of SFN #2 and RO #2 in subframe #7 and subframe #9 of SFN #3 with PO #2 overlapping with the idle period 406 in subframe #1 and subframe #3 of SFN #1, PO #2 in subframe #1 and subframe #3 of SFN #2 and PO #2 in subframe #1 and subframe #3 of SFN #3 The UE derives the mapping ratio as ceil (6/6)=1. Further the UE maps the RO #2 in subframe #7 of SFN #0 to PO #2 in subframe #1 of SFN #1, maps the RO #2 in subframe #9 of SFN #0 to PO #2 in subframe #3 of SFN #1 and the like. In some aspects, the mapping may result in unused ROs or POs, or both. By implementing the RO-to-PO mapping, SSBs can be mapped to POs based on a SSB-to-RO mapping and RO-to-PO mapping.

For each group, the valid ROs may be mapped to corresponding valid PUSCH occasions in the following order: first, in increasing order of frequency resource indexes for frequency multiplexed POs. Second, in increasing order of DMRS indexes within a single PO. DMRS indexes within a single PO may be in increasing order of DMRS port first and DMRS sequences second. Third, in increasing order of time resource indexes for time multiplexed POs within a PUSCH slot. Fourth, in increasing order of indexes for PUSCH slots.

FIG. 4E is an example of a PUSCH configuration for two PRACH configurations 440 when a common PUSCH configuration set is configured. In some implementations, two PRACH configurations may be used to transmit PRACH in the idle period 406. Hence, in order to transmit PUSCH in the idle period 406, one approach may include configuring a common PUSCH configuration set for the first PRACH configuration 442 and the second PRACH configuration 444. Each PRACH configuration may provide a set of RO resources such that a set of RO resources may be configured by first PRACH configuration 442, and another set of RO resources may be configured by second PRACH configuration 444. For both PRACH configurations, a common PUSCH configuration set may be configured. A common PUSCH configuration set may correspond to a consistent configuration of a number of PO resources per PUSCH configuration.

The PUSCH configuration for two PRACH configurations 440 may include a single time offset with respect to the start of each PRACH slot of the two PRACH configurations, counted as the number of slots configured. Further, the PO per PUSCH configuration may be divided to two groups. A first group 452 may include POs outside the idle period 406 in FFP 402 (i.e., valid PUSCH occasions in the current wireless communication system). A second group 454 may include POs which are overlapped with the idle period 406 in FFP 402.

FIG. 4F is a further example of a PUSCH configuration for two PRACH configurations 440 when a common PUSCH configuration set is configured. The UE may perform two rounds of RO-to-PO mapping. The UE may first perform RO-to-PO mapping for the first PRACH configuration 442 and first group of POs 452, then perform RO-to-PO mapping for the second PRACH configuration 444 and second group of Pos 454. The first mapping may include mapping the ROs falling outside the idle period 406 and associated with the first PRACH configuration 442 to the first group of POs 452 not overlapping with the idle period 406. The second mapping may include mapping the ROs falling inside or overlapping with the idle period 406 and associated with the second PRACH configuration 444 to the second group of POs 454 overlapping with the idle period 406. In both cases, unused ROs and POs may result from the mapping.

For each PRACH configuration, the ROs may be mapped to corresponding valid PUSCH occasions in the following order: first, in increasing order of frequency resource indexes for frequency multiplexed POs. Second, in increasing order of DMRS indexes within a single PO. DMRS indexes within a single PO may be in increasing order of DMRS port first and DMRS sequences second. Third, in increasing order of time resource indexes for time multiplexed POs within a PUSCH slot. Fourth, in increasing order of indexes for PUSCH slots.

FIG. 4G is an example of a PUSCH configuration for two PRACH configurations 460 when separate PUSCH configuration sets are configured. Specifically, separate PUSCH configuration sets including a first PUSCH configuration set 468 and a second PUSCH configuration set 472 may be configured for the first PRACH configuration 462 and the second PRACH configuration 466. Further, each PUSCH configuration set may be associated with one PRACH configuration. The first set of PUSCH configuration 468 may be associated with a previous PUSCH configuration(s), and the second set of PUSCH configuration 472 may be a distinct PUSCH configuration(s).

The PUSCH configuration for two PRACH configurations 460 may include separate time offsets with respect to the start of each PRACH slot of the corresponding PRACH configurations, counted as the number of slots configured. For the second PUSCH configurations 472, the POs may be configured within the idle period 406. The UE may perform two rounds RO-to-PO mapping. The UE may first perform a first round of RO-to-PO mapping 464 for the first PRACH configuration 462 and first set of PUSCH configurations 468, and then perform a second round of RO-to-PO mapping 470 for the second PRACH configuration 466 and second set of PUSCH configurations 472.

FIG. 4H is a further example of a PUSCH configuration for two PRACH configurations 470 when separate PUSCH configuration sets are configured. The first round of RO-to-PO mapping 464 may include mapping the ROs falling outside the idle period 406 and associated with the first PRACH configuration 462 to the POs in the first set of PUSCH configurations 468 not overlapping with the idle period 406. The second round of RO-to-PO mapping 470 may include mapping the ROs falling inside or overlapping with the idle period 406 and associated with the first second PRACH configuration 466 to the POs in the second set of PUSCH configurations 472 overlapping with the idle period 406. In both cases, unused ROs and POs may result from the mapping.

For each PRACH configuration, the valid ROs are mapped to corresponding valid PUSCH occasions in the following order: first, in increasing order of frequency resource indexes for frequency multiplexed POs. Second, in increasing order of DMRS indexes within a single PO. DMRS indexes within a single PO may be in increasing order of DMRS port first and DMRS sequences second. Third, in increasing order of time resource indexes for time multiplexed POs within a PUSCH slot. Fourth, in increasing order of indexes for PUSCH slots.

FIG. 4I is an example of a single association pattern period 480 used for two rounds RO-to-PO mapping. An association period, starting from frame 0, for mapping SS/PBCH block indexes to PRACH occasions may be the smallest value in the set determined by the PRACH configuration period according to Table 1 such that N B SS/PBCH block indexes may be mapped at least once to the ROs within the association period, where a UE may obtain NB from the value of ssb-PositionsInBurst in SIB1 or in ServingCellConfigCommon. If after an integer number of SS/PBCH block indexes to RO mapping cycles within the association period there is a set of RO or PRACH preambles that are not mapped to NB SS/PBCH block indexes, no SS/PBCH block indexes may be mapped to the set of POs or PRACH preambles.

TABLE 1

| PRACH configuration period (ms) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

An association pattern period may include one or more association periods and may be determined so that a pattern between ROs and SS/PBCH block indexes repeats at most every 160 msec. ROs not associated with SS/PBCH block indexes after an integer number of association periods, if any, may not be used for PRACH transmissions.

The association pattern period for RO-to-PO mapping may be determined according to at least two implementations. In a first implementation as shown in FIG. 4J, a single association pattern period may be used for two rounds RO-to-PO mapping. Specifically, the association pattern period for each group may be derived, respectively. In one example, a maximum association pattern period may be used as the association pattern period for both groups. In another example, the association pattern period of the first group may be used for both groups. In some aspects, the UE may not be expected to receive the configuration such that the association pattern period of the first group is smaller than the association pattern period of the second group.

In a first aspect, a single association period 482 of a maximum or first association pattern period includes a first group of ROs and a second group of ROs in the same association period. In some implementations, POs need not be considered during the association period. The association pattern period may correspond to four PRACH periods and the association period also may correspond to four PRACH periods. In a second aspect, a dual association period 484 of a maximum or first association pattern period may include the first group of ROs in a first association period and a second group of ROs in a second association period.

In both the single association period 482 and the dual association period 484, the PRACH configuration period may be 10 ms. Further, for the first group of ROs, the number of valid ROs in one PRACH period may be two ROs. For the second group ROs, the number of valid ROs in one PRACH period may be four ROs. The number of transmitted SSBs may be six SSBs. Additionally, the SSB configuration period may correspond to 40 ms. Moreover, the association period for first group may correspond to four PRACH configuration periods, and the association period for the second group may correspond to two PRACH configuration periods.

FIG. 4J is an example of two association pattern periods 490 used for two rounds RO-to-PO mapping. Specifically, two association pattern periods 490 may be used for two rounds RO-to-PO mapping. The association pattern period for each group may be derived, and the corresponding association pattern period may be used for each respective group. In some aspects, a single association period 492 or a dual association period may be used according to a dual association pattern period approach.

As shown, in a first aspect, a single association period 492 may use separate association pattern periods. For example, the single association period 492 may include a common association period of four PRACH periods associated with a first group and a second group. The single association period 492 may include a first association pattern period of four PRACH periods associated with a first group. The single association period 492 also may include a second association pattern period of four PRACH periods associated with a second group. In some aspects, the second association pattern period may be associated with four PRACH periods. An association pattern period may be derived based on association period, so the second association pattern period also may be associated with the association period. In some implementations, the association period for the first group and the second group may be common.

In a second aspect, a dual association period 494 also may include separate association pattern periods. For instance, the single association period 494 may include a first association pattern period of four PRACH periods and an association period of four PRACH periods associated with a first group. The single association period 494 also may include a second association pattern period of four PRACH periods and an association period of two PRACH periods associated with a second group.

FIG. 5 is a flowchart of an example method 500 of wireless communication at an apparatus of a UE. In an example, a UE, such as the UE 104 depicted and described in FIGS. 1, 3 and 7, or components thereof, can perform the functions described in method 500.

At block 502, an FFP defining an idle period may be received from a network entity via system information or RRC signaling. In some aspects, the communicating component 342, such as in conjunction with processor(s) 312, memory 316, or transceiver 302, may be configured to receive, from a network entity via system information or RRC signaling, an FFP defining an idle period. Thus, the UE 104, the processor(s) 312, the communicating component 342 or one of its subcomponents may define the means for receiving, from a network entity via system information or RRC signaling, an FFP defining an idle period.

At block 504, a RO resource or a PO resource overlapping with the idle period of the FFP may be determined. In some aspects, the communicating component 342, such as in conjunction with processor(s) 312, memory 316, or transceiver 302, may be configured to determine that a RO resource or a PO resource overlaps with the idle period of the FFP. Thus, the UE 104, the processor(s) 312, the communicating component 342 or one of its subcomponents may define the means for determining that a RO resource or a PO resource overlaps with the idle period of the FFP.

In some implementations, one of the RO resource or the PO resource is mapped to an SSB.

At block 506, the RO resource to the PO resource may be mapped based on determining that the RO resource or the PO resource overlaps with the idle period of the FFP. In some aspects, the communicating component 342, such as in conjunction with processor(s) 312, memory 316, or transceiver 302, may be configured to map the RO resource to the PO resource based on determining that the RO resource or the PO resource overlaps with the idle period of the FFP. Thus, the UE 104, the processor(s) 312, the communicating component 342 or one of its subcomponents may define the means for mapping the RO resource to the PO resource based on determining that the RO resource or the PO resource overlaps with the idle period of the FFP.

Figure 6A:
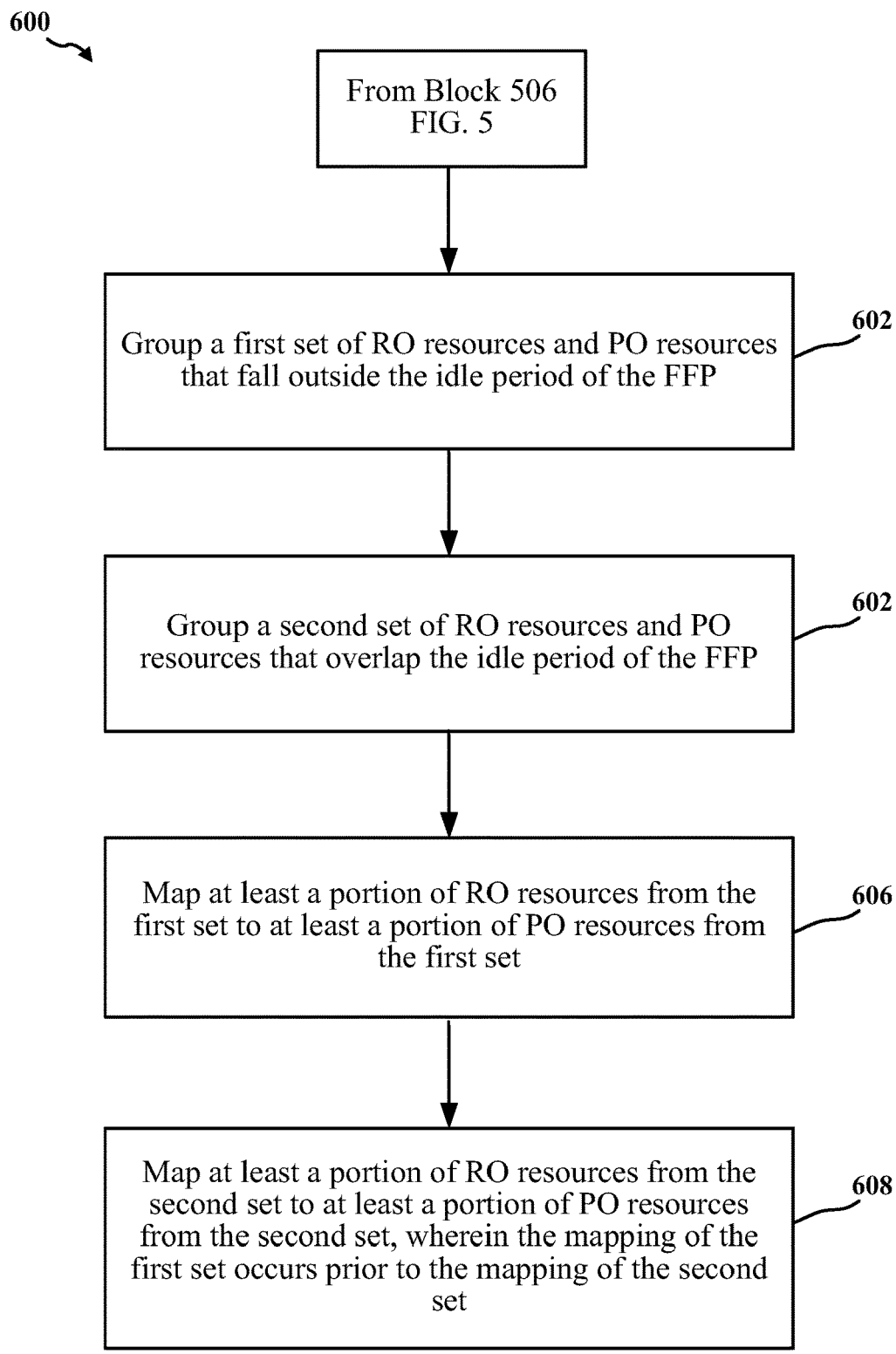
FIG. 6A is a flowchart of an example method of performing two rounds of Ro-to-PO mapping.
Figure 6B:
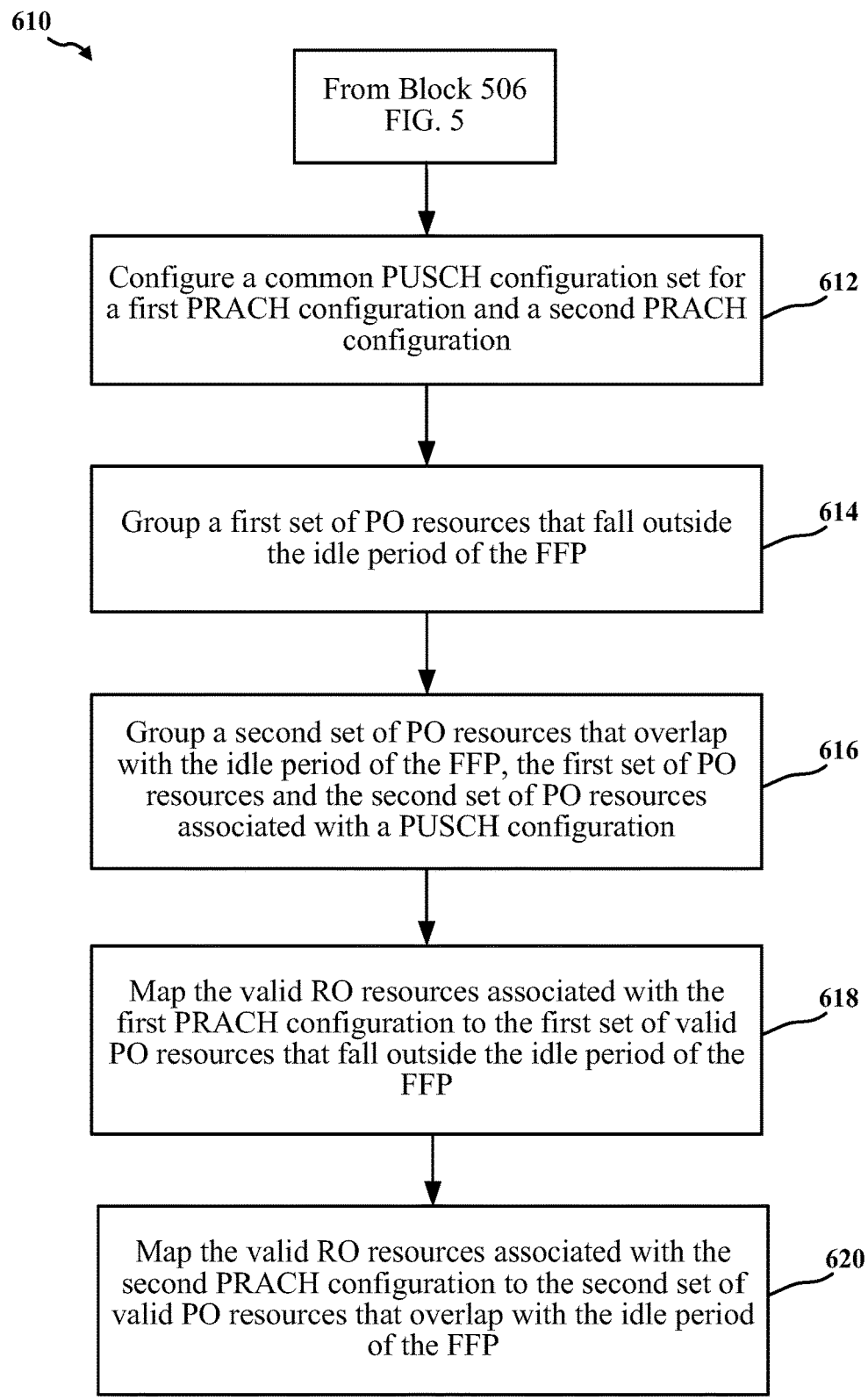
FIG. 6B is a flowchart of an example method of a PUSCH configuration for two PRACH configurations.
Figure 6C:
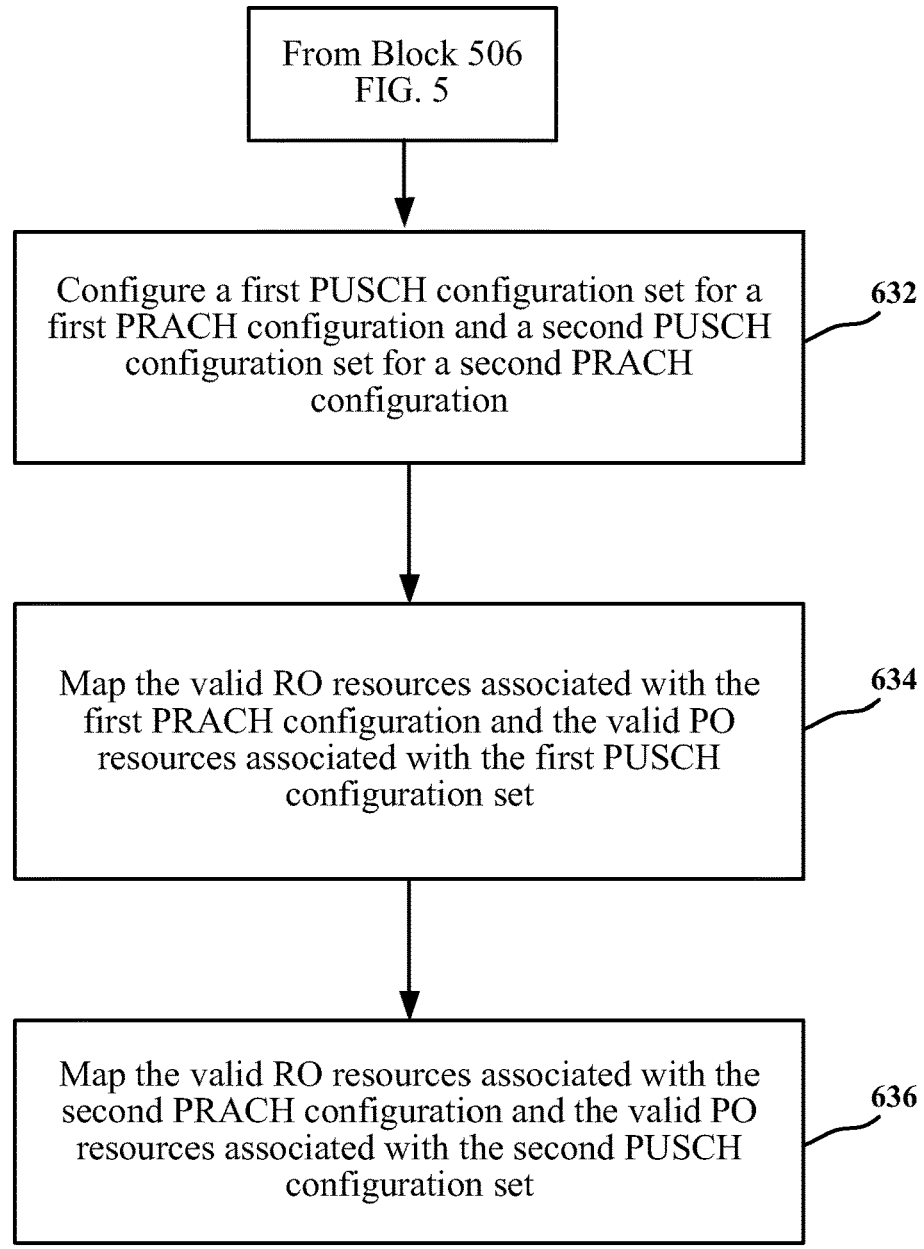
FIG. 6C is a flowchart of another example method of a PUSCH configuration for two PRACH configurations.

In some implementations, mapping the RO resource to the PO resources may be performed in any one of a number of ways as shown in FIGS. 6A-6C, and as further described herein.

In some implementations, mapping the RO resource to the PO resource may be further based on an association pattern period including one or more association periods defining a minimum repeat time for a pattern between an RO and an SSB index.

In some implementations, the association pattern period may be common for each group of RO resources and PO resources.

In some implementations, the association pattern period may correspond to a maximum associated pattern period across each group of RO resources and PO resources.

In some implementations, the association pattern period may correspond to a first associated pattern period for a first group of RO resources and PO resources.

In some implementations, the association pattern period may be different for each group of RO resources and PO resources.

At block 508, a RACH procedure may be performed according at least to the mapping of the RO to the PO. In some aspects, the communicating component 342, such as in conjunction with processor(s) 312, memory 316, or transceiver 302, may be configured to perform a RACH procedure according at least to the mapping of the RO to the PO. Thus, the UE 104, the processor(s) 312, the communicating component 342 or one of its subcomponents may define the means for performing a RACH procedure according at least to the mapping of the RO to the PO.

In some implementations, performing the RACH procedure may include one of performing a four-step RACH procedure or a two-step RACH procedure.

In some implementations, the UE may support URLLC communication or IIoT.

FIG. 6A is a flowchart of an example method 600 of wireless communication at an apparatus of a UE. In an example, a UE, such as the UE 104 depicted and described in FIGS. 1, 3 and 7, or components thereof, can perform the functions described in method 600.

At block 602, a first set of RO resources and PO resources that fall outside the idle period of the FFP may be grouped. In some aspects, the communicating component 342, such as in conjunction with processor(s) 312, memory 316, or transceiver 302, may be configured to group a first set of RO resources and PO resources that fall outside the idle period of the FFP. Thus, the UE 104, the processor(s) 312, the communicating component 342 or one of its subcomponents may define the means for grouping a first set of RO resources and PO resources that fall outside the idle period of the FFP.

At block 604, a first set of RO resources and PO resources that fall outside the idle period of the FFP may be grouped. In some aspects, the communicating component 342, such as in conjunction with processor(s) 312, memory 316, or transceiver 302, may be configured to group a first set of RO resources and PO resources that fall outside the idle period of the FFP. Thus, the UE 104, the processor(s) 312, the communicating component 342 or one of its subcomponents may define the means for grouping a first set of RO resources and PO resources that fall outside the idle period of the FFP.

At block 606, at least a portion of RO resources from the first set may be mapped to at least a portion of PO resources from the first set. In some aspects, the communicating component 342, such as in conjunction with processor(s) 312, memory 316, or transceiver 302, may be configured to map at least a portion of RO resources from the first set to at least a portion of PO resources from the first set. Thus, the UE 104, the processor(s) 312, the communicating component 342 or one of its subcomponents may define the means for mapping at least a portion of RO resources from the first set to at least a portion of PO resources from the first set.

At block 608, at least a portion of RO resources from the second set may be mapped to at least a portion of PO resources from the second set, where the mapping of the first set occurs prior to the mapping of the second set. In some aspects, the communicating component 342, such as in conjunction with processor(s) 312, memory 316, or transceiver 302, may be configured to map at least a portion of RO resources from the second set to at least a portion of PO resources from the second set, where the mapping of the first set occurs prior to the mapping of the second set. Thus, the UE 104, the processor(s) 312, the communicating component 342 or one of its subcomponents may define the means for mapping at least a portion of RO resources from the second set to at least a portion of PO resources from the second set, where the mapping of the first set occurs prior to the mapping of the second set.

In some implementations, at least the portion of RO resources from the second set may be mapped to a number of SSB resources.

In some implementations, at least the portion of RO resources from the first set may be mapped to at least the portion of PO resources from the first set and at least the portion of RO resources from the second set may be mapped to at least the portion of PO resources from the second set in accordance with an increasing order of frequency resource indexes for frequency multiplexed POs, DMRS indexes within a single PO, time resource indexes for time multiplexed POs within a PUSCH slot, and indexes for PUSCH slots.

FIG. 6B is a flowchart of an example method 610 of wireless communication at an apparatus of a UE. In an example, a UE, such as the UE 104 depicted and described in FIGS. 1, 3 and 7, or components thereof, can perform the functions described in method 610.

At block 612, a common PUSCH configuration set for a first PRACH configuration and a second PRACH configuration may be configured. In some aspects, the communicating component 342, such as in conjunction with processor(s) 312, memory 316, or transceiver 302, may be configured to configure a common PUSCH configuration set for a first PRACH configuration and a second PRACH configuration. Thus, the UE 104, the processor(s) 312, the communicating component 342 or one of its subcomponents may define the means for configuring a common PUSCH configuration set for a first PRACH configuration and a second PRACH configuration.

In some implementations, a start time of a PRACH slot of the first PRACH configuration and a start time of a second PRACH slot of the second PRACH configuration may be offset according to a single time offset value.

At block 614, a first set of PO resources that fall outside the idle period of the FFP may be grouped. In some aspects, the communicating component 342, such as in conjunction with processor(s) 312, memory 316, or transceiver 302, may be configured to group a first set of PO resources that fall outside the idle period of the FFP. Thus, the UE 104, the processor(s) 312, the communicating component 342 or one of its subcomponents may define the means for grouping a first set of PO resources that fall outside the idle period of the FFP.

At block 616, a second set of PO resources that overlap with the idle period of the FFP may be grouped, the first set of PO resources and the second set of PO resources associated with a PUSCH configuration. In some aspects, the communicating component 342, such as in conjunction with processor(s) 312, memory 316, or transceiver 302, may be configured to group a second set of PO resources that overlap with the idle period of the FFP, the first set of PO resources and the second set of PO resources associated with a PUSCH configuration. Thus, the UE 104, the processor(s) 312, the communicating component 342 or one of its subcomponents may define the means for grouping a second set of PO resources that overlap with the idle period of the FFP, the first set of PO resources and the second set of PO resources associated with a PUSCH configuration.

At block 618, the valid RO resources associated with the first PRACH configuration may be mapped to the first set of valid PO resources that fall outside the idle period of the FFP. In some aspects, the communicating component 342, such as in conjunction with processor(s) 312, memory 316, or transceiver 302, may be configured to map the valid RO resources associated with the first PRACH configuration to the first set of valid PO resources that fall outside the idle period of the FFP. Thus, the UE 104, the processor(s) 312, the communicating component 342 or one of its subcomponents may define the means for mapping the valid RO resources associated with the first PRACH configuration to the first set of valid PO resources that fall outside the idle period of the FFP.

At block 620, the valid RO resources associated with the second PRACH configuration may be mapped to the second set of valid PO resources that overlap with the idle period of the FFP. In some aspects, the communicating component 342, such as in conjunction with processor(s) 312, memory 316, or transceiver 302, may be configured to map the valid RO resources associated with the second PRACH configuration to the second set of valid PO resources that overlap with the idle period of the FFP. Thus, the UE 104, the processor(s) 312, the communicating component 342 or one of its subcomponents may define the means for mapping the valid RO resources associated with the second PRACH configuration to the second set of valid PO resources that overlap with the idle period of the FFP.

In some implementations, the valid RO resources associated with the first PRACH configuration is mapped to the first set of valid PO resources that fall outside the idle period of the FFP and the valid RO resources associated with the second PRACH configuration is mapped to the second set of valid PO resources that overlap with the idle period of the FFP in accordance with an increasing order of frequency resource indexes for frequency multiplexed POs, DMRS indexes within a single PO, time resource indexes for time multiplexed POs within a PUSCH slot, and indexes for PUSCH slots.

FIG. 6C is a flowchart of an example method 630 of wireless communication at an apparatus of a UE. In an example, a UE, such as the UE 104 depicted and described in FIGS. 1, 3 and 7, or components thereof, can perform the functions described in method 630.

At block 632, a first PUSCH configuration set for a first PRACH configuration and a second PUSCH configuration set for a second PRACH configuration may be configured. In some aspects, the communicating component 342, such as in conjunction with processor(s) 312, memory 316, or transceiver 302, may be configured to configure a first PUSCH configuration set for a first PRACH configuration and a second PUSCH configuration set for a second PRACH configuration. Thus, the UE 104, the processor(s) 312, the communicating component 342 or one of its subcomponents may define the means for configuring a first PUSCH configuration set for a first PRACH configuration and a second PUSCH configuration set for a second PRACH configuration.

In some implementations, a start time of a PRACH slot of the first PRACH configuration may be offset according to a first time offset value and a start time of a second PRACH slot of the second PRACH configuration may be offset according to a second time offset value same or different from the first time offset value.

In some implementations, the second PUSCH configuration set may include a number of PO resources configured within the idle period of the FFP.

At block 634, the valid RO resources associated with the first PRACH configuration and the valid PO resources associated with the first PUSCH configuration set may be mapped. In some aspects, the communicating component 342, such as in conjunction with processor(s) 312, memory 316, or transceiver 302, may be configured to map the valid RO resources associated with the first PRACH configuration and the valid PO resources associated with the first PUSCH configuration set. Thus, the UE 104, the processor(s) 312, the communicating component 342 or one of its subcomponents may define the means for mapping the valid RO resources associated with the first PRACH configuration and the valid PO resources associated with the first PUSCH configuration set.

At block 636, the valid RO resources associated with the second PRACH configuration and the valid PO resources associated with the second PUSCH configuration set may be mapped. In some aspects, the communicating component 342, such as in conjunction with processor(s) 312, memory 316, or transceiver 302, may be configured to map the valid RO resources associated with the second PRACH configuration and the valid PO resources associated with the second PUSCH configuration set. Thus, the UE 104, the processor(s) 312, the communicating component 342 or one of its subcomponents may define the means for mapping the valid RO resources associated with the second PRACH configuration and the valid PO resources associated with the second PUSCH configuration set.

In some implementations, the valid RO resources associated with the first PRACH configuration and the valid PO resources associated with the first PUSCH configuration set are mapped, and the valid RO resources associated with the second PRACH configuration and the valid PO resources associated with the second PUSCH configuration set are mapped in accordance with an increasing order of frequency resource indexes for frequency multiplexed POs, DMRS indexes within a single PO, time resource indexes for time multiplexed POs within a PUSCH slot, and indexes for PUSCH slots.

Some further examples:

In some aspects, techniques for transmission of RACH related information during an idle period may include additional aspects, such as any single aspect or any combination of aspects described below or in connection with one or more other processes or devices described elsewhere herein. In some aspects, such techniques may include an apparatus configured to receive, from a network entity via system information or RRC signaling, a FFP defining an idle period. The apparatus may further be configured to determine that a RO resource or a PO resource overlaps with the idle period of the FFP. The apparatus may further be configured to map the RO resource to the PO resource based on determining that the RO resource or the PO resource overlaps with the idle period of the FFP. The apparatus may further perform a RACH procedure according at least to the mapping of the RO to the PO. In some implementations, the apparatus may include at least one processor, and a memory coupled to the processor. The processor may be configured to perform operations described herein with respect to a UE. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a first aspect, mapping the RO to the PO includes grouping a first set of RO resources and PO resources that fall outside the idle period of the FFP, and grouping a second set of RO resources and PO resources that overlap the idle period of the FFP.

In a second aspect, alone or in combination with the first aspect, the apparatus is further configured to map at least a portion of RO resources from the first set to at least a portion of PO resources from the first set, map at least a portion of RO resources from the second set to at least a portion of PO resources from the second set, where the mapping of the first set occurs prior to the mapping of the second set.

In a third aspect, alone or in combination with one or more of the first through second aspects, at least the portion of RO resources from the second set are mapped to a number of SSB resources.

In a fourth aspect, alone or in combination with one or more of the first through second aspects, at least the portion of RO resources from the first set are mapped to at least the portion of PO resources from the first set and at least the portion of RO resources from the second set are mapped to at least the portion of PO resources from the second set in accordance with an increasing order of a frequency resource indexes for frequency multiplexed POs, DMRS indexes within a single PO, time resource indexes for time multiplexed POs within a PUSCH slot, and indexes for PUSCH slots.

In a fifth aspect, the apparatus is further configured to configure a common PUSCH configuration set for a first PRACH configuration and a second PRACH configuration.

In a sixth aspect, alone or in combination with the fifth aspect, a start time of a PRACH slot of the first PRACH configuration a start time of a second PRACH slot of the second PRACH configuration is offset according to a single time offset value.

In a seventh aspect, alone or in combination with the fifth aspect, mapping the RO to the PO includes grouping a first set of PO resources that fall outside the idle period of the FFP, and grouping a second set of PO resources that overlap with the idle period of the FFP, the first set of PO resources and the second set of PO resources associated with a PUSCH configuration.

In an eighth aspect, alone or in combination with one or more of the fifth through seventh aspects, the apparatus is further configured to map the valid RO resources associated with the first PRACH configuration to the first set of valid PO resources that fall outside the idle period of the FFP, and map the valid RO resources associated with the second PRACH configuration to the second set of valid PO resources that overlap with the idle period of the FFP.

In an ninth aspect, alone or in combination with one or more of the fifth through eighth aspects, the valid RO resources associated with the first PRACH configuration is mapped to the first set of valid PO resources that fall outside the idle period of the FFP and the valid RO resources associated with the second PRACH configuration is mapped to the second set of valid PO resources that overlap with the idle period of the FFP in accordance with an increasing order of a frequency resource indexes for frequency multiplexed POs, demodulation reference signal (DMRS) indexes within a single PO, time resource indexes for time multiplexed POs within a PUSCH slot, and indexes for PUSCH slots.

In a tenth aspect, the apparatus is further configured to configure a first PUSCH configuration set for a first PRACH configuration and a second PUSCH configuration set for a second PRACH configuration.

In an eleventh aspect, alone or in combination with the tenth aspect, a start time of a PRACH slot of the first PRACH configuration is offset according to a first time offset value and a start time of a second PRACH slot of the second PRACH configuration is offset according to a second time offset value same or different from the first time offset value.

In a twelfth aspect, alone or in combination with the tenth aspect, the second PUSCH configuration set includes a number of PO resources configured within the idle period of the FFP.

In a thirteenth aspect, alone or in combination with the tenth through twelfth aspects, mapping the RO to the PO includes mapping the valid RO resources associated with the first PRACH configuration and the valid PO resources associated with the first PUSCH configuration set, and mapping the valid RO resources associated with the second PRACH configuration and the valid PO resources associated with the second PUSCH configuration set.

In a fourteenth aspect, alone or in combination with the tenth through thirteenth aspects, the valid RO resources associated with the first PRACH configuration and the valid PO resources associated with the first PUSCH configuration set are mapped, and the valid RO resources associated with the second PRACH configuration and the valid PO resources associated with the second PUSCH configuration set are mapped in accordance with an increasing order of a frequency resource indexes for frequency multiplexed POs, demodulation reference signal (DMRS) indexes within a single PO, time resource indexes for time multiplexed POs within a PUSCH slot, and indexes for PUSCH slots.

Figure 7:
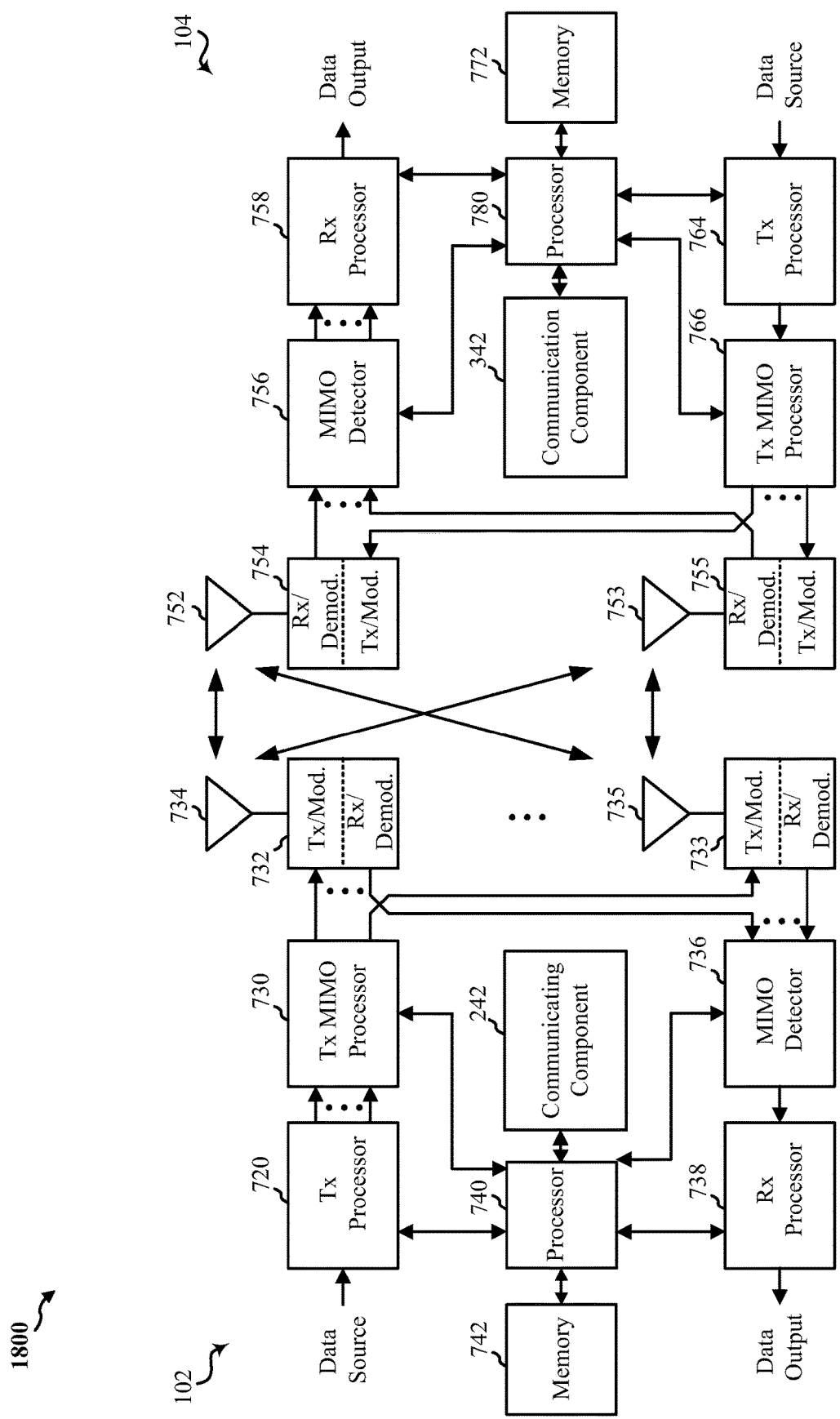
FIG. 7 is a block diagram illustrating an example of a MIMO communication system including a BS and a UE.

FIG. 7 is a block diagram of a MIMO communication system 700 including a base station 102 (such as the base station 102 depicted and described in FIGS. 1, 2 and 7) and a UE 104 (such as the UE 104 depicted and described in FIGS. 1, 3 and 7). The MIMO communication system 700 may be configured to transmit RACH related information (i.e., MsgA) during an idle period of an FFP, described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (such as FIGS. 1 and 2). The processor 720 may in some cases execute stored instructions to instantiate a communicating component 342 (such as FIGS. 1 and 3).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware.

Each of the noted components may be a means for performing one or more functions related to operation of the MIMO communication system 700.

An Appendix is included that is part of the present application and provides additional details related to the various aspects of the present disclosure.

As used herein, a phrase referring to "at least one of" a list of items refers to any combination of those items, including single members. As an example, "at least one of: a, b, or c" is intended to cover: a, b, c, a-b, a-c, b-c, and a-b-c. The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication at an apparatus of a user equipment (UE), comprising:
    receiving, from a network entity via system information or radio resource control (RRC) signaling, a fixed frame period (FFP) defining an idle period;

determining that a physical random access channel (PRACH) occasion (RO) resource or a physical uplink shared channel (PUSCH) occasion (PO) resource overlaps with the idle period of the FFP;

mapping the RO resource to the PO resource based on determining that the RO resource or the PO resource overlaps with the idle period of the FFP, wherein mapping the RO resource to the PO resource includes:
grouping a first set of RO resources and PO resources that fall outside the idle period of the FFP; and
grouping a second set of RO resources and PO resources that overlap the idle period of the FFP; and performing a random access channel (RACH) procedure according at least to the mapping of the RO to the PO.

2. The method of claim 1, further comprising:
mapping at least a portion of RO resources from the first set to at least a portion of PO resources from the first set; and
mapping at least a portion of RO resources from the second set to at least a portion of PO resources from the second set, wherein the mapping of the first set occurs prior to the mapping of the second set.

3. The method of claim 2, wherein at least the portion of RO resources from the second set are mapped to a number of synchronization signal block (SSB) resources, or wherein at least the portion of RO resources from the first set are mapped to at least the portion of PO resources from the first set and at least the portion of RO resources from the second set are mapped to at least the portion of PO resources from the second set in accordance with an increasing order of:
frequency resource indexes for frequency multiplexed POs,
demodulation reference signal (DMRS) indexes within a single PO,
time resource indexes for time multiplexed POs within a PUSCH slot, and
indexes for PUSCH slots.

4. The method of claim 1, further comprising configuring a common PUSCH configuration set for a first PRACH configuration and a second PRACH configuration.

5. The method of claim 4, wherein a start time of a PRACH slot of the first PRACH configuration and a start time of a second PRACH slot of the second PRACH configuration is offset according to a single time offset value.

6. The method of claim 4, wherein mapping the RO to the PO includes:
grouping a first set of PO resources that fall outside the idle period of the FFP;
grouping a second set of PO resources that overlap with the idle period of the FFP, the first set of PO resources and the second set of PO resources associated with a PUSCH configuration; and
further comprising:
mapping valid RO resources associated with the first PRACH configuration to the first set of PO resources that fall outside the idle period of the FFP; and
mapping valid RO resources associated with the second PRACH configuration to the second set of PO resources that overlap with the idle period of the FFP.

7. The method of claim 6, wherein the valid RO resources associated with the first PRACH configuration is mapped to the first set of PO resources that fall outside the idle period of the FFP and the valid RO resources associated with the second PRACH configuration is mapped to the second set of PO resources that overlap with the idle period of the FFP in accordance with an increasing order of:
frequency resource indexes for frequency multiplexed POs,
demodulation reference signal (DMRS) indexes within a single PO,
time resource indexes for time multiplexed POs within a PUSCH slot, and
indexes for PUSCH slots.

8. The method of claim 1, further comprising configuring a first PUSCH configuration set for a first PRACH configuration and a second PUSCH configuration set for a second PRACH configuration, wherein a start time of a PRACH slot of the first PRACH configuration is offset according to a first time offset value and a start time of a second PRACH slot of the second PRACH configuration is offset according to a second time offset value from the first time offset value.

9. The method of claim 1, further comprising configuring a first PUSCH configuration set for a first PRACH configuration and a second PUSCH configuration set for a second PRACH configuration, wherein the second PUSCH configuration set includes a number of valid PO resources configured within the idle period of the FFP.

10. The method of claim 9, wherein mapping the RO to the PO includes:
mapping valid RO resources associated with the first PRACH configuration and valid PO resources associated with the first PUSCH configuration set; and
mapping valid RO resources associated with the second PRACH configuration and the valid PO resources associated with the second PUSCH configuration set.

11. The method of claim 10, wherein the valid RO resources associated with the first PRACH configuration and the valid PO resources associated with the first PUSCH configuration set are mapped, and the valid RO resources associated with the second PRACH configuration and the valid PO resources associated with the second PUSCH configuration set are mapped in accordance with an increasing order of:
frequency resource indexes for frequency multiplexed POs,
demodulation reference signal (DMRS) indexes within a single PO,
time resource indexes for time multiplexed POs within a PUSCH slot, and
indexes for PUSCH slots.

12. The method of claim 1, wherein mapping the RO resource to the PO resource is further based on an association pattern period including one or more association periods defining a minimum repeat time for a pattern between an RO and a synchronization signal block (SSB) index; and one of:
wherein the association pattern period is common for each group of RO resources and PO resources;
wherein the association pattern period corresponds to a maximum associated pattern period across each group of RO resources and PO resources;
wherein the association pattern period corresponds to a first associated pattern period for a first group of RO resources and PO resources; or
wherein the association pattern period is different for each group of RO resources and PO resources.

13. The method of claim 1, wherein one of the RO resource or the PO resource is mapped to a synchronization signal block (SSB).

14. The method of claim 1, wherein performing the RACH procedure includes one of performing a four-step RACH procedure or a two-step RACH procedure, or wherein the UE supports ultra-reliable low-latency communication (URLLC) communication or industrial internet of things (IIoT).

15. The method of claim 1, wherein the first set of RO resources is determined based at least in part on the first PRACH configuration and the second set of RO resources is determined based at least in part on the second PRACH configuration.

16. An apparatus for wireless communication at an apparatus of a user equipment (UE), comprising:
a memory; and
a processor in communication with the memory and configured to:
receive, from a network entity via system information or radio resource control (RRC) signaling, a fixed frame period (FFP) defining an idle period;
determine that a physical random access channel (PRACH) occasion (RO) resource or a physical uplink shared channel (PUSCH) occasion (PO) resource overlaps with the idle period of the FFP;
map the RO resource to the PO resource based on determining that the RO resource or the PO resource overlaps with the idle period of the FFP, wherein to map the RO resource to the PO resource includes:
grouping a first set of RO resources and PO resources that fall outside the idle period of the FFP; and
grouping a second set of RO resources and PO resources that overlap the idle period of the FFP; and
perform a random access channel (RACH) procedure according at least to the map of the RO to the PO.

17. The apparatus of claim 16, wherein the processor is further configured to:
map at least a portion of RO resources from the first set to at least a portion of PO resources from the first set; and
map at least a portion of RO resources from the second set to at least a portion of PO resources from the second set, wherein the mapping of the first set occurs prior to the map of the second set.

18. The apparatus of claim 17, wherein at least the portion of RO resources from the second set are mapped to a number of synchronization signal block (SSB) resources, or
wherein at least the portion of RO resources from the first set are mapped to at least the portion of PO resources from the first set and at least the portion of RO resources from the second set are mapped to at least the portion of PO resources from the second set in accordance with an increasing order of:
frequency resource indexes for frequency multiplexed POs,
demodulation reference signal (DMRS) indexes within a single PO,
time resource indexes for time multiplexed POs within a PUSCH slot, and
indexes for PUSCH slots.

19. The apparatus of claim 16, wherein the processor is further configured to configure a common PUSCH configuration set for a first PRACH configuration and a second PRACH configuration.

20. The apparatus of claim 19, wherein a start time of a PRACH slot of the first PRACH configuration and a start time of a second PRACH slot of the second PRACH configuration is offset according to a single time offset value.

21. The apparatus of claim 19, wherein to map the RO to the PO includes:

group a first set of PO resources that fall outside the idle period of the FFP; and
group a second set of PO resources that overlap with the idle period of the FFP, the first set of PO resources and the second set of PO resources associated with a PUSCH configuration; and
wherein the processor is further configured to:
map valid RO resources associated with the first PRACH configuration to the first set of PO resources that fall outside the idle period of the FFP; and
map valid RO resources associated with the second PRACH configuration to the second set of PO resources that overlap with the idle period of the FFP.

22. The apparatus of claim 21, wherein the valid RO resources associated with the first PRACH configuration is mapped to the first set of PO resources that fall outside the idle period of the FFP and the valid RO resources associated with the second PRACH configuration is mapped to the second set of PO resources that overlap with the idle period of the FFP in accordance with an increasing order of:
frequency resource indexes for frequency multiplexed POs,
demodulation reference signal (DMRS) indexes within a single PO,
time resource indexes for time multiplexed POs within a PUSCH slot, and
indexes for PUSCH slots.

23. The apparatus of claim 16, wherein the processor is further configured to configure a first PUSCH configuration set for a first PRACH configuration and a second PUSCH configuration set for a second PRACH configuration, and wherein a start time of a PRACH slot of the first PRACH configuration is offset according to a first time offset value and a start time of a second PRACH slot of the second PRACH configuration is offset according to a second time offset value from the first time offset value.

24. The apparatus of claim 16, wherein the processor is further configured to configure a first PUSCH configuration set for a first PRACH configuration and a second PUSCH configuration set for a second PRACH configuration, and wherein the second PUSCH configuration set includes a number of valid PO resources configured within the idle period of the FFP.

25. The apparatus of claim 24, wherein to map the RO to the PO includes:
map valid RO resources associated with the first PRACH configuration and valid PO resources associated with the first PUSCH configuration set; and
map valid RO resources associated with the second PRACH configuration and the valid PO resources associated with the second PUSCH configuration set.

26. The apparatus of claim 25, wherein the valid RO resources associated with the first PRACH configuration and the valid PO resources associated with the first PUSCH configuration set are mapped, and the valid RO resources associated with the second PRACH configuration and the valid PO resources associated with the second PUSCH configuration set are mapped in accordance with an increasing order of:
frequency resource indexes for frequency multiplexed POs,
demodulation reference signal (DMRS) indexes within a single PO,
time resource indexes for time multiplexed POs within a PUSCH slot, and
indexes for PUSCH slots.

27. The apparatus of claim 16, wherein to map the RO resource to the PO resource is further based on an association pattern period including one or more association periods defining a minimum repeat time for a pattern between an RO and a synchronization signal block (SSB) index; and one of:
  wherein the association pattern period is common for each group of RO resources and PO resources;
  wherein the association pattern period corresponds to a maximum associated pattern period across each group of RO resources and PO resources;
  wherein the association pattern period corresponds to a first associated pattern period for a first group of RO resources and PO resources; or
  wherein the association pattern period is different for each group of RO resources and PO resources.

28. The apparatus of claim 16, wherein one of the RO resource or the PO resource is mapped to a synchronization signal block (SSB).

29. The apparatus of claim 16, wherein to perform the RACH procedure includes one of to perform a four-step RACH procedure or a two-step RACH procedure; or
  wherein the UE supports ultra-reliable low-latency communication (URLLC) communication or industrial internet of things (IIoT).

30. The apparatus of claim 16, wherein the first set of RO resources is determined based at least in part on the first PRACH configuration and the second set of RO resources is determined based at least in part on the second PRACH configuration.

* * * * *